(12) United States Patent
Takimoto et al.

(10) Patent No.: US 10,775,639 B2
(45) Date of Patent: Sep. 15, 2020

(54) LENS DRIVING DEVICE, CAMERA MODULE, AND CAMERA MOUNTING APPARATUS

(71) Applicants: Yukihiro Takimoto, Tokyo (JP); Keiichi Sato, Tokyo (JP); Ichiro Hayashi, Tokyo (JP)

(72) Inventors: Yukihiro Takimoto, Tokyo (JP); Keiichi Sato, Tokyo (JP); Ichiro Hayashi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 129 days.

(21) Appl. No.: 16/049,845

(22) Filed: Jul. 31, 2018

(65) Prior Publication Data

US 2019/0033613 A1    Jan. 31, 2019

(30) Foreign Application Priority Data

Jul. 31, 2017    (JP) ................................ 2017-148077

(51) Int. Cl.

| | | |
|---|---|---|
| *G02B 27/64* | (2006.01) | |
| *G02B 5/06* | (2006.01) | |
| *H02K 41/035* | (2006.01) | |
| *H04N 5/232* | (2006.01) | |
| *G03B 5/06* | (2006.01) | |

(Continued)

(52) U.S. Cl.
CPC ............. *G02B 27/646* (2013.01); *G02B 7/08* (2013.01); *G03B 5/06* (2013.01); *H02K 41/0356* (2013.01); *H04N 5/2254* (2013.01); *H04N 5/2257* (2013.01); *H04N 5/23287* (2013.01); *G03B 3/10* (2013.01); *G03B 2205/0023* (2013.01); *G03B 2205/0069* (2013.01)

(58) Field of Classification Search
CPC .......... G02B 27/646; G02B 7/08; G02B 7/09; G03B 5/02; G03B 5/06; G03B 5/10; G03B 2205/0023; G03B 2205/0069
See application file for complete search history.

(56) References Cited

U.S. PATENT DOCUMENTS

| | | | |
|---|---|---|---|
| 10,197,762 B2 * | 2/2019 | Park | ...................... G02B 27/646 |
| 2017/0115466 A1 | 4/2017 | Murakami et al. | |
| 2019/0353921 A1 * | 11/2019 | Otomo | ...................... G02B 7/08 |

FOREIGN PATENT DOCUMENTS

WO    2016/006168 A1    1/2016

* cited by examiner

*Primary Examiner* — William R Alexander
*Assistant Examiner* — Ephrem Z Mebrahtu
(74) *Attorney, Agent, or Firm* — Brundidge & Stanger, P.C.

(57) ABSTRACT

A lens driving device including: a fixing part disposed in such a manner that the fixing part is separated from the movable part in the direction of the optical axis; and suspension wires that extend along the direction of the optical axis and support the movable part with respect to the fixing part in such a manner that the movable part is displaceable in the direction orthogonal to the direction of the optical axis, a first end of each suspension wire being fixed to the fixing part, a second end of each suspension wire being fixed to the movable part, in which the fixing part includes a base member and a wire connecting member, the wire connecting member including a main body part and a wire connecting part exposed from the base member, the first end of each suspension wire being fixed to the wire connecting part.

7 Claims, 21 Drawing Sheets

(51) Int. Cl.
*G02B 7/08* (2006.01)
*H04N 5/225* (2006.01)
*G03B 3/10* (2006.01)

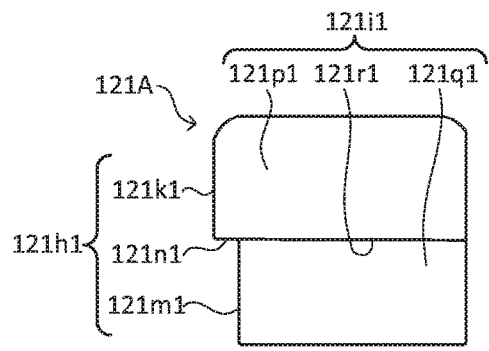
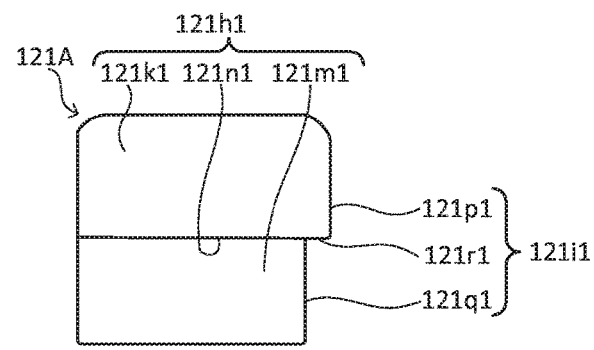
FIG.13A  FIG. 13B
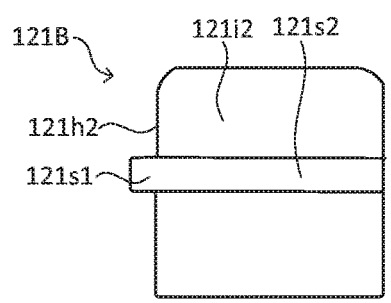
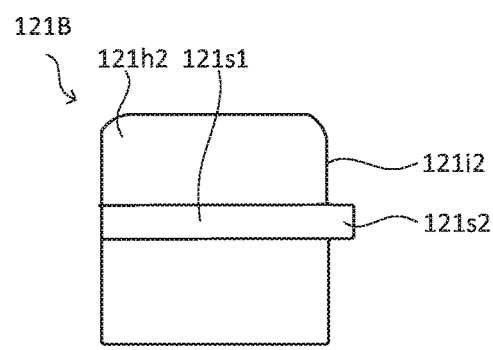
FIG. 14A  FIG. 14B

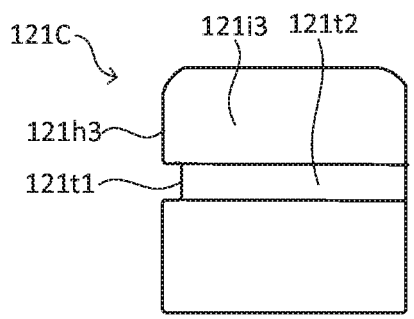
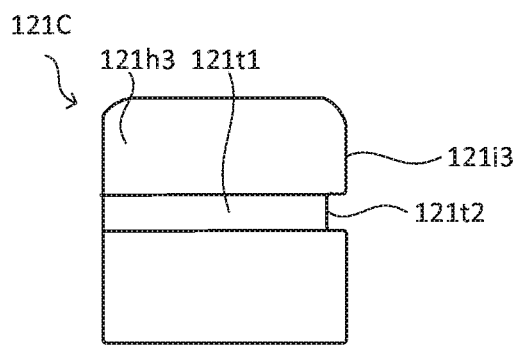
FIG. 15A　　　　　　　　FIG. 15B
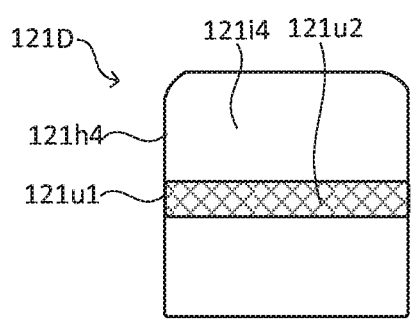
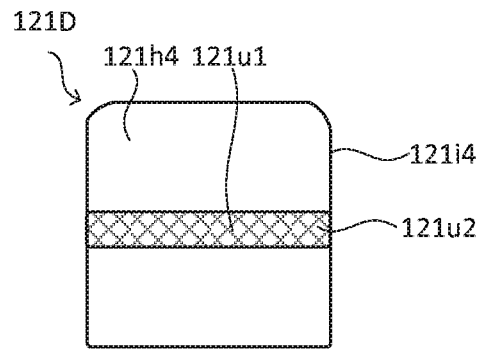
FIG. 16A　　　　　　　　FIG. 16B

LENS DRIVING DEVICE, CAMERA MODULE, AND CAMERA MOUNTING APPARATUS

CROSS REFERENCE TO RELATED APPLICATIONS

This application is entitled to and claims the benefit of Japanese Patent Application No. 2017-148077, filed on Jul. 31, 2017, the disclosure of which including the specification, drawings and abstract is incorporated herein by reference in its entirety.

TECHNICAL FIELD

The present invention relates to a lens driving device, a camera module, and a camera mounting apparatus.

BACKGROUND ART

Conventionally, various lens holder drive apparatuses for capturing a clear image by preventing blurring on the imaging surface even with hand shake (vibration) when capturing an image of a still picture have been proposed.

For example, PTL 1 discloses a hand shake correction device in which a permanent magnet for an auto-focus (AF) lens driving device serves also as a permanent magnet for a hand shake correction device for the purpose of achieving reduction in size and height.

In the hand shake correction device disclosed in PTL 1, the OIS fixing part is separated from the OIS movable part in the light axis direction on the rear side of the OIS movable part serving also as the auto-focusing lens driving device. One ends of (lower ends) a plurality of suspension wires are fixed at the outer periphery part of the OIS fixing part. The other ends (upper ends) of the suspension wires are firmly fixed to the OIS movable part.

To be more specific, in the hand shake correction device disclosed in PTL 1, the one ends (lower ends) of the suspension wires are fixed at the four corners of the coil substrate for holding the OIS coil in the OIS fixing part. The coil substrate is disposed on the OIS movable part side relative to the base member in the OIS fixing part. It is to be noted that the base member is aimed at positioning of the coil substrate and the sensor substrate in the OIS fixing part.

CITATION LIST

Patent Literature

PTL 1
WO2016/006168

SUMMARY OF INVENTION

Technical Problem

Incidentally, in the above-described hand shake correction device disclosed in PTL 1, the one end (lower end) of each suspension wire is fixed to the coil substrate closer to the OIS movable part relative to the base member. Accordingly, the distance between the positions where the both ends of each suspension wire are fixed in the light axis direction is short. Since the effective length of the suspension wire depends on the above-mentioned distance, the effective length of the suspension wire is difficult to ensure when the above-mentioned distance is short.

An object of the present invention is to provide a lens driving device, a camera module, and a camera mounting apparatus which can ensure the effective length of the suspension wire.

Solution to Problem

To achieve the above-mentioned object, a lens driving device according to the present invention corrects shake by moving a movable part holding a lens barrel in a direction orthogonal to a direction of an optical axis, the lens driving device including: a fixing part disposed in such a manner that the fixing part is separated from the movable part in the direction of the optical axis; and a plurality of suspension wires that extend along the direction of the optical axis and support the movable part with respect to the fixing part in such a manner that the movable part is displaceable in the direction orthogonal to the direction of the optical axis, a first end of each suspension wire being fixed to the fixing part, a second end of each suspension wire being fixed to the movable part. The fixing part includes a base member formed of a non-conductive material and a wire connecting member formed of a conductive material, the wire connecting member including a main body part embedded in the base member and a wire connecting part exposed from the base member at a position remote from the movable part relative to the main body part in the direction of the optical axis, the first end of each suspension wire being fixed to the wire connecting part.

A camera module according to an aspect of the present invention includes: the above-mentioned lens driving device; a lens part held by a movable part through a lens barrel; and an image pickup part that picks up a subject image imaged by the lens part.

A camera mounting apparatus according to an aspect of the present invention is an information apparatus or a transporting apparatus, the camera mounting apparatus including: the above-mentioned camera module; and a control part that handles image information obtained by the camera module.

Advantageous Effects of Invention

The present invention provides a lens driving device, a camera module, and a camera mounting apparatus which can ensure the effective length of the suspension wire.

BRIEF DESCRIPTION OF DRAWINGS

FIG. 13A is a schematic view of a part of a stopper protrusion as viewed in the direction of arrow $A_1$ of FIG. 12;

FIG. 13B is a schematic view of a part of the stopper protrusion as viewed in the direction of arrow $A_2$ of FIG. 12;

FIG. 14A is a schematic view of a part of the stopper protrusion as viewed in the direction of arrow $A_1$ of FIG. 12;

FIG. 14B is a schematic view of a part of the stopper protrusion as viewed in the direction of arrow $A_2$ of FIG. 12;

FIG. 15A is a schematic view of a part of the stopper protrusion as viewed in the direction of arrow $A_1$ of FIG. 12;

FIG. 15B is a schematic view of a part of the stopper protrusion as viewed in the direction of arrow $A_2$ of FIG. 12;

FIG. 16A is a schematic view of a part of the stopper protrusion as viewed in the direction of arrow $A_1$ of FIG. 12;

FIG. 16B is a schematic view of a part of the stopper protrusion as viewed in the direction of arrow $A_2$ of FIG. 12;

DESCRIPTION OF EMBODIMENT

An embodiment of the present invention is described below with reference to the accompanying drawings.

1. Embodiment

Figure 1A:
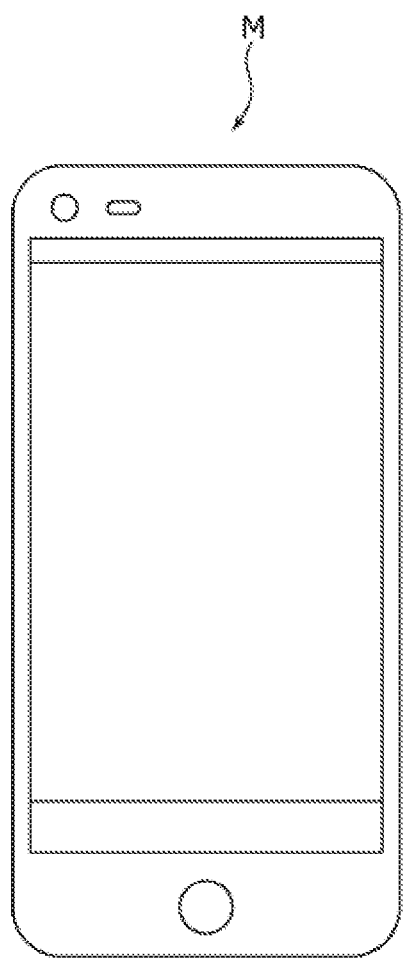
FIG. 1A and FIG. 1B illustrate a smartphone including a camera module according to an embodiment of the present invention.
Figure 1B:
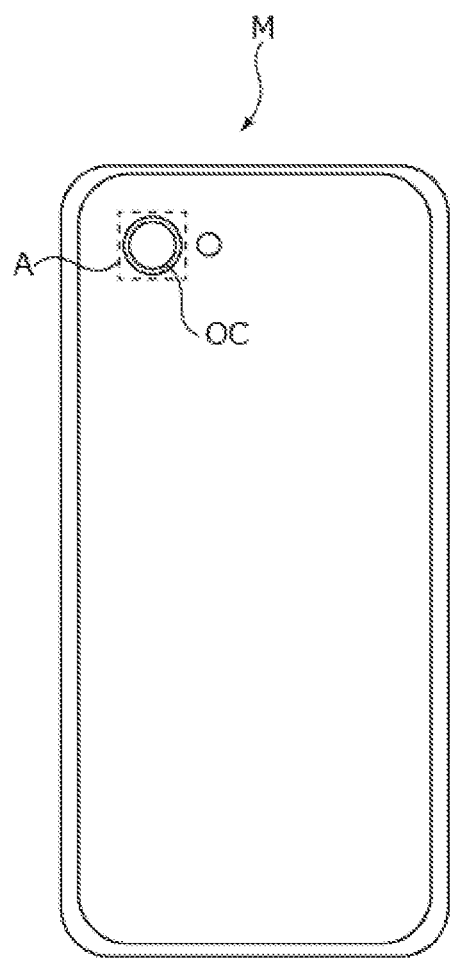
Figure 2:
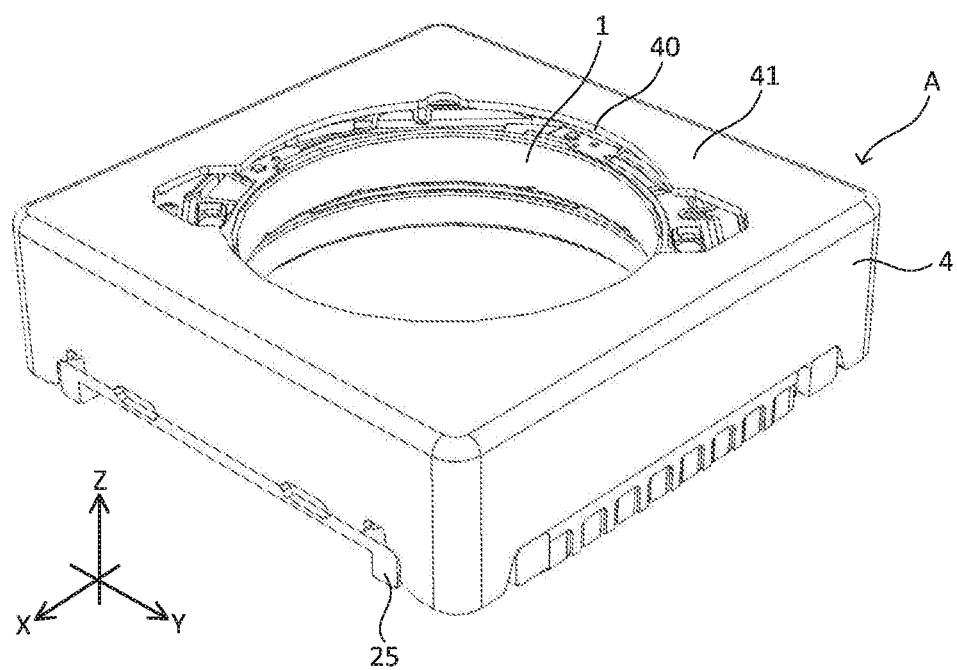
FIG. 2 is a perspective view of an external appearance of the camera module.
Figure 3:
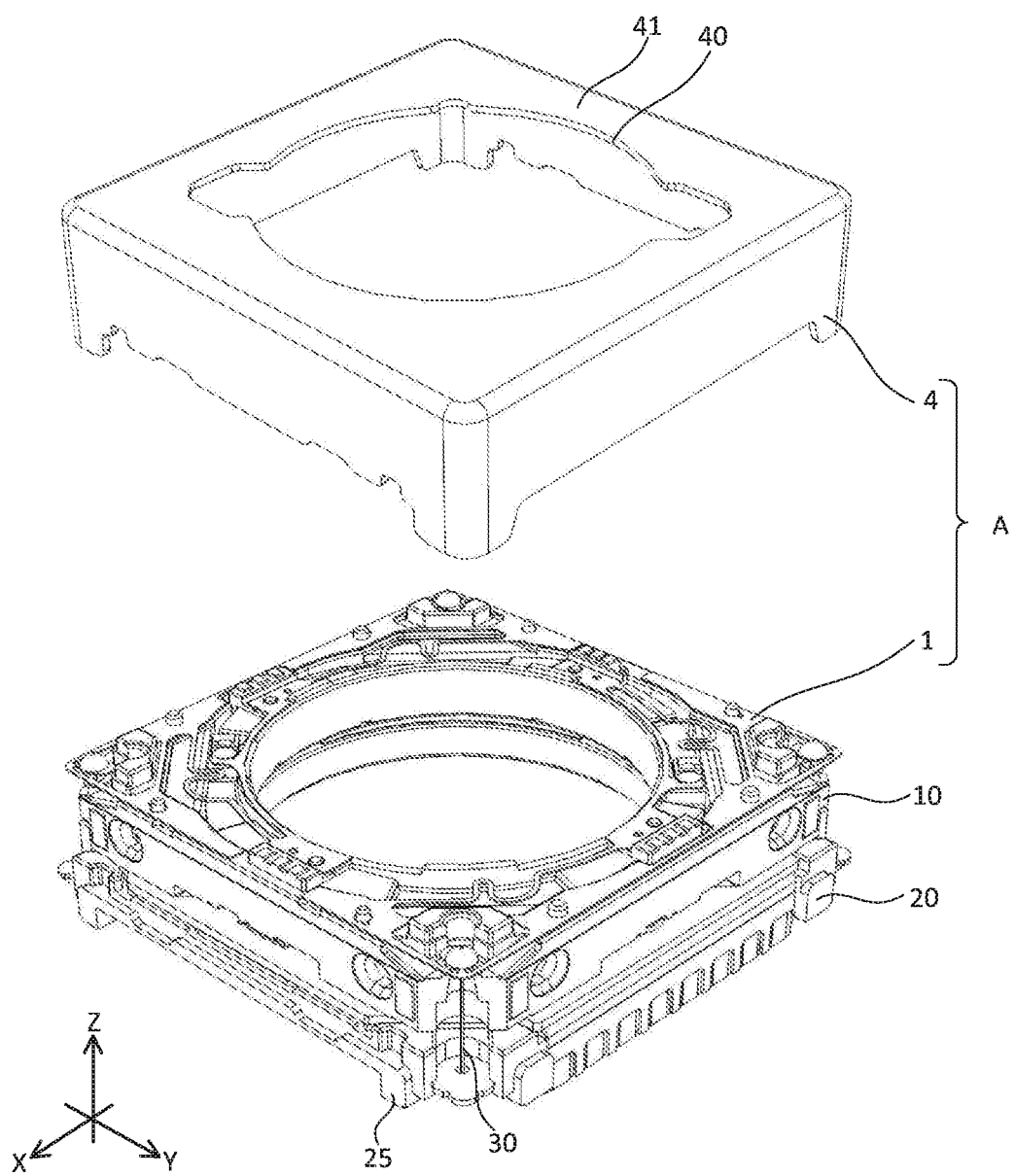
FIG. 3 is an exploded perspective view of the camera module.
Figure 4:
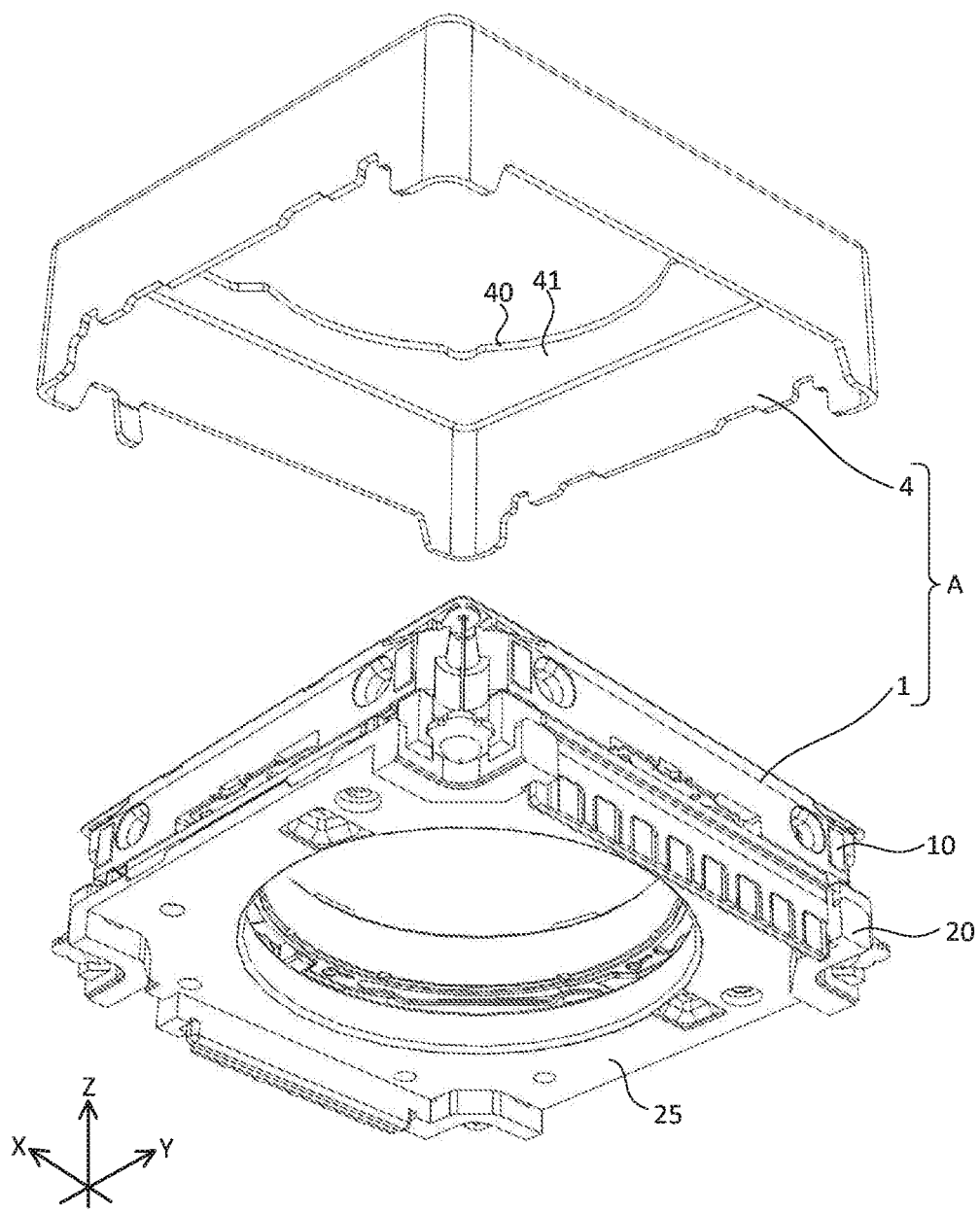
FIG. 4 is an exploded perspective view of the camera module.

FIG. 1A and FIG. 1B illustrate smartphone M including camera module A according to an embodiment of the present invention. FIG. 1A is a front view of smartphone M, and FIG. 1B is a rear view of smartphone M. FIG. 2 is a perspective view of an external appearance of camera module A. FIG. 3 and FIG. 4 are exploded perspective views of camera module A. FIG. 3 is an upper perspective view, and FIG. 4 is a lower perspective view.

As illustrated in FIG. 2 to FIG. 4, the present embodiment will be described with an orthogonal coordinate system (X, Y, Z). Also in the drawings described later, descriptions will be made with an orthogonal coordinate system (X, Y, Z). In addition, the intermediate directions between the X and the Y directions, or in other words, the diagonal directions in plan view in the Z direction of camera module A are the U direction and the V direction (see FIG. 17).

Camera module A is mounted such that the vertical direction (or the horizontal direction) is the X direction, the horizontal direction (or the vertical direction) is the Y direction, and the front-rear direction is the Z direction at the time of actually capturing an image with smartphone M. That is, the Z direction is the light axis direction, the + side (for example, the upper side in FIG. 2) in the Z direction is the light reception side in the light axis direction (also referred to as the macro position side), and the − side (for example, the lower side in FIG. 2) in the Z direction is the imaging side in the light axis direction (also referred to as infinity position side). In addition, the X direction and the Y direction orthogonal to the Z axis may be referred to as "direction orthogonal to the optical axis," and the XY plane may be referred to as "plane orthogonal to the optical axis."

In addition, in the following description of the members of camera module A, "radial direction" and "circumferential direction" are directions in OIS movable part 10 described later (to be more specific, lens holder 110 and magnet holder 12a; see FIG. 7) unless otherwise noted.

In addition, for convenience of the following descriptions, in plan view of camera module A illustrated in FIG. 2 and the components of camera module A in the Z direction, the corner part on the + side in the X direction and on the + side in the Y direction is referred to as a first corner part, the corner part on the − side in the X direction and on the + side in the Y direction as a second corner part, the corner part on the − side in the X direction and on the − side in the Y direction as a third corner part, and the corner part on the + side in the X direction and on the − side in the Y direction as a fourth corner part.

For example, smartphone M illustrated in FIG. 1A and FIG. 1B is provided with camera module A as a back side camera OC. In camera module A, lens driving device 1 is employed. Lens driving device 1 has an auto-focusing function of automatically performing focusing for capturing a subject (hereinafter referred to as "AF (Auto Focus) function"), and a shake-correcting function (or "shake-correcting part," hereinafter referred to as "OIS (Optical Image Stabilization) function") of optically correcting handshake (vibration) upon capturing an image to reduce the irregularities of the image.

Auto-focusing and shake-correcting lens driving device 1 includes an auto-focusing driving part (hereinafter referred to as "AF driving part") for moving the lens part in the light axis direction, and a shake-correcting driving part (hereinafter referred to as "OIS driving part") for swaying the lens part in the plane orthogonal to the optical axis.

(Camera Module)

Camera module A includes a lens part (not illustrated) in which a lens is housed in a lens barrel (not illustrated) having a cylindrical shape, auto-focusing and shake-correcting lens driving device 1, an image capturing part (not illustrated) that captures a subject image imaged with the lens part, cover 4, and the like.

(Cover)

As viewed in plan view in the Z direction (light axis direction) cover 4 is a capped square cylindrical body having a square shape, and includes circular opening 40 in the top surface (surface on the + side in the Z direction). A lens part (not illustrated) is exposed to the outside through opening 40. Cover 4 is fixed to lens driving device 1 (base member 25) with an adhesive agent (not illustrated) for example.

(Image Pickup Part)

The image pickup part (not illustrated) is disposed on the − side in the Z direction (the imaging side in the light axis direction) of lens driving device 1. The image pickup part includes an imaging device (not illustrated) such as a charge-coupled device (CCD) image sensor and a complementary metal oxide semiconductor (CMOS) image sensor and a sensor substrate on which to mount the imaging device. The imaging device picks up a subject image imaged by a lens part (not illustrated), for example. Lens driving device 1 is mounted on the sensor substrate (not illustrated), and electrically connected with the sensor substrate.

(Lens Driving Device)

Figure 5:
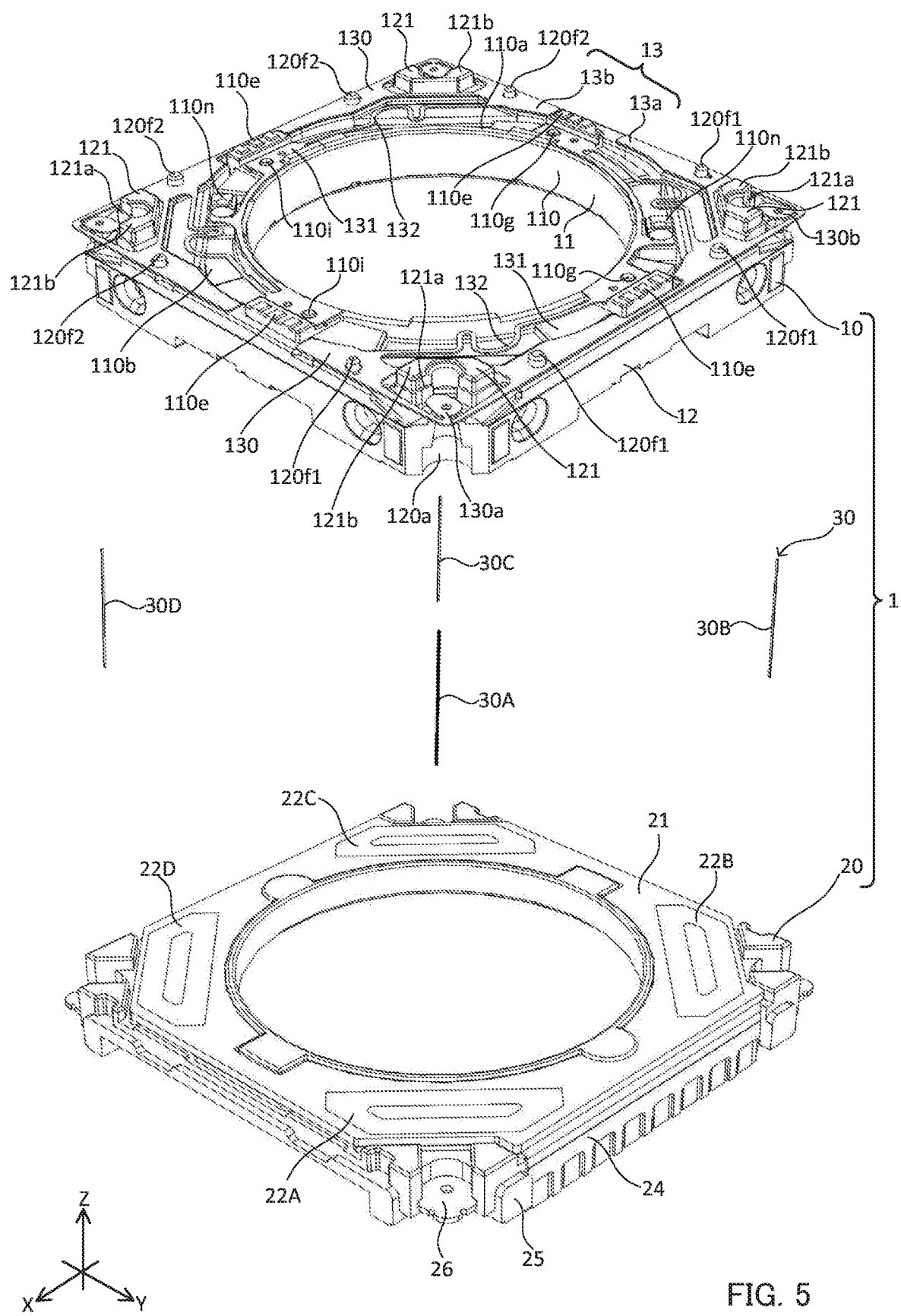
FIG. 5 is an exploded perspective view of a lens driving device.
Figure 6:
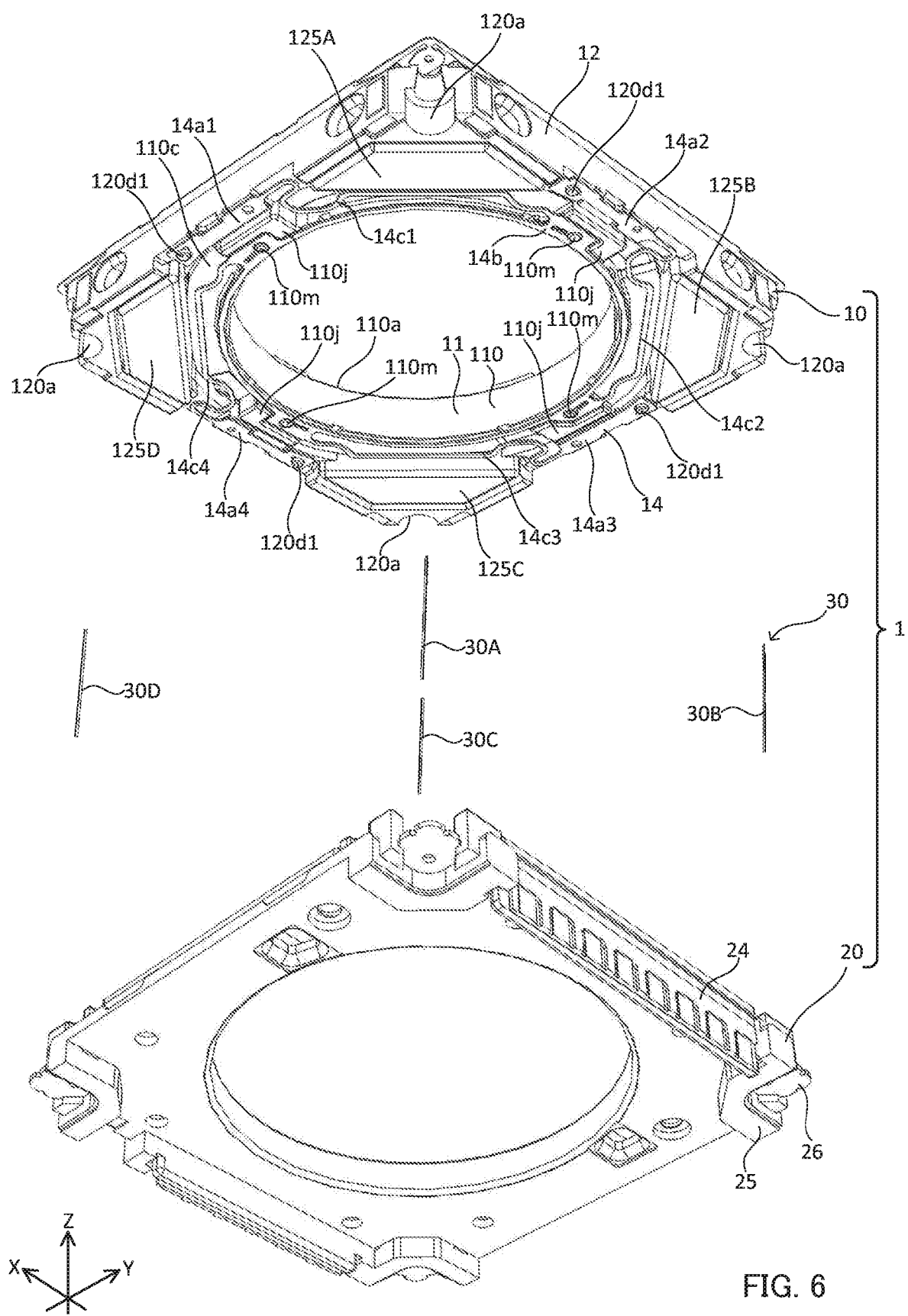
FIG. 6 is an exploded perspective view of the lens driving device as viewed at a different angle than FIG. 5.
Figure 7:
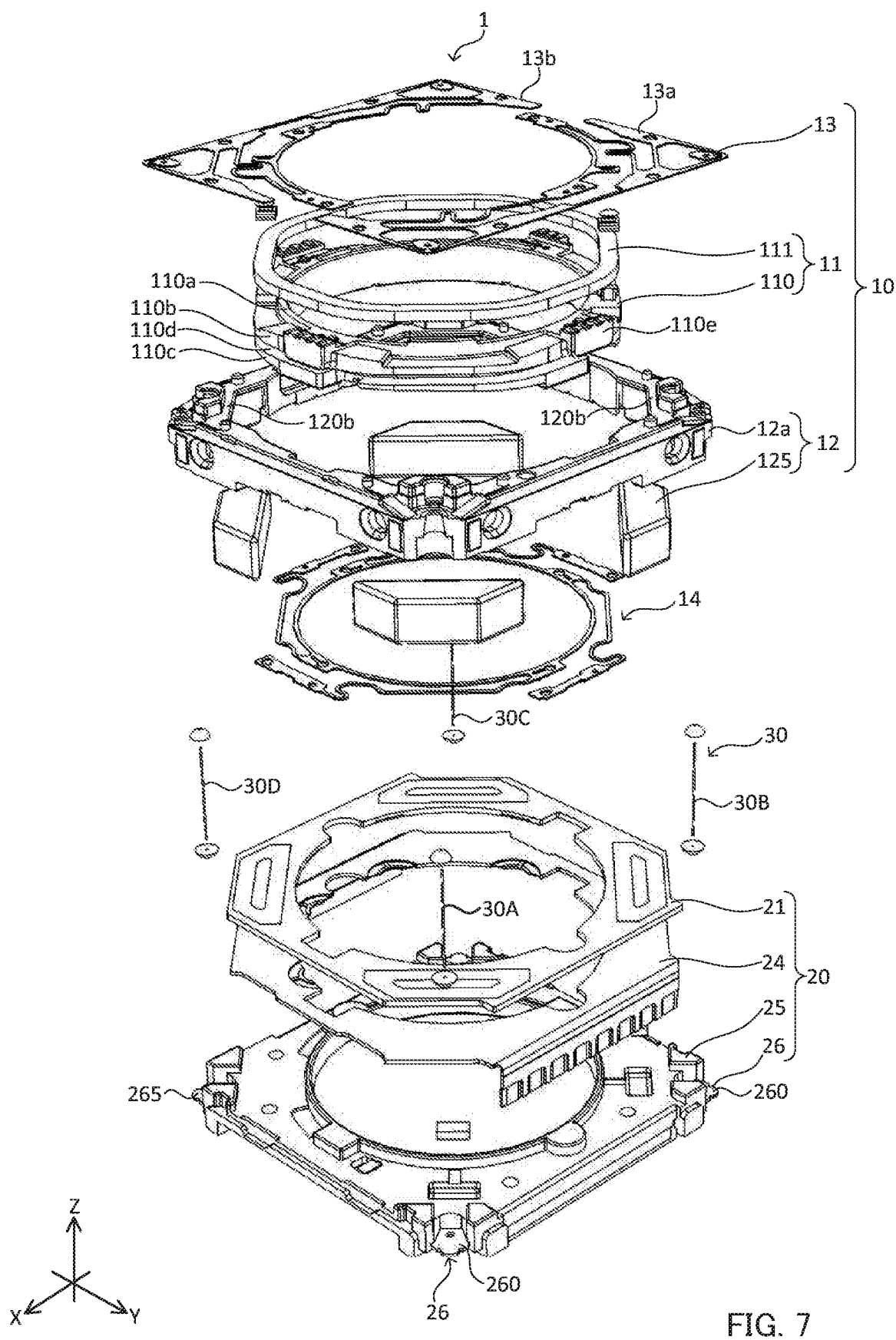
FIG. 7 is an exploded perspective view of the lens driving device.
Figure 8:
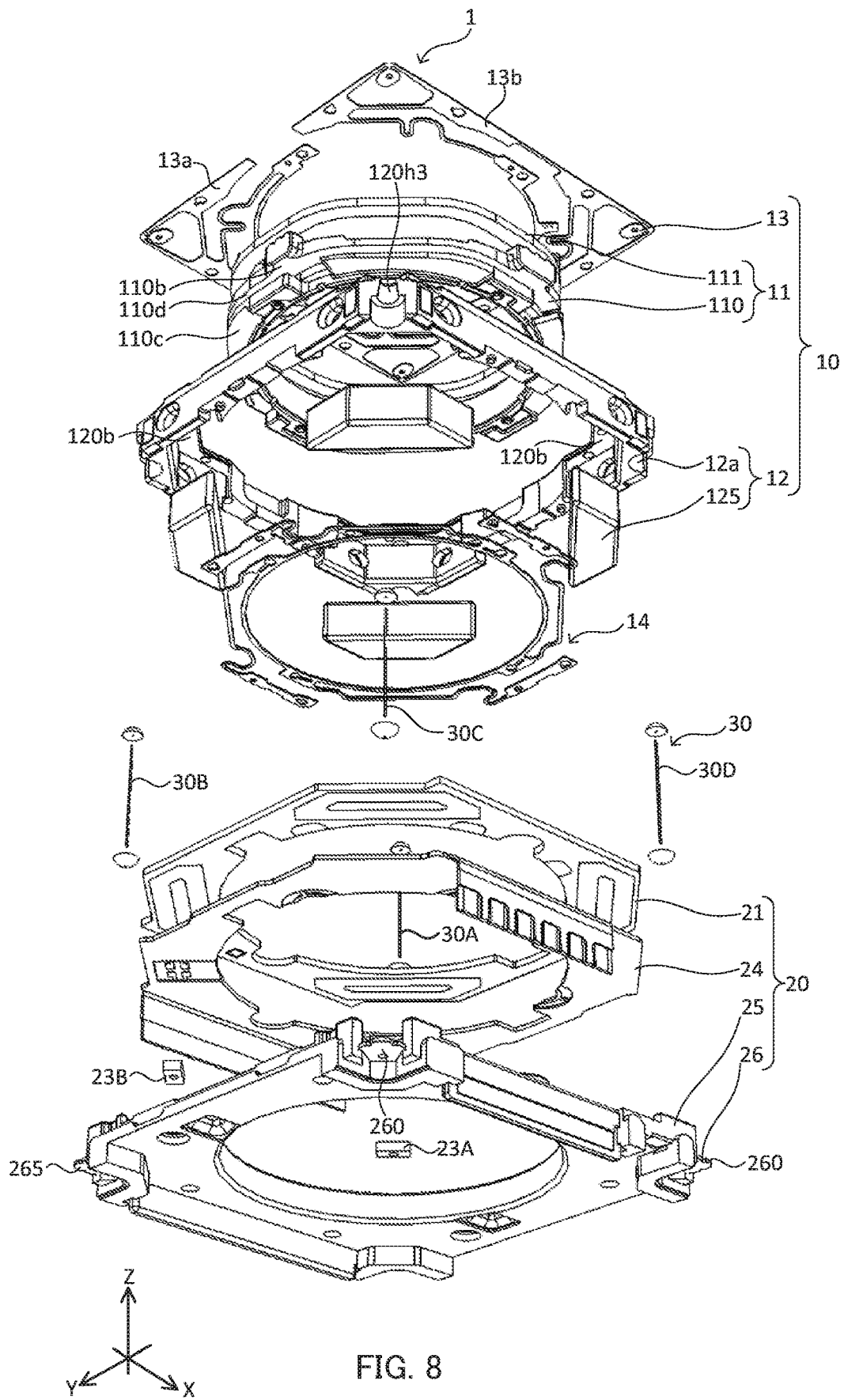
FIG. 8 is an exploded perspective view of the lens driving device as viewed at a different angle than FIG. 7.

FIG. 5 to FIG. 8 are exploded perspective views of lens driving device 1. FIG. 5 and FIG. 7 are upper perspective views, and FIG. 6 and FIG. 8 are lower perspective views. It is to be noted that FIG. 8 is an exploded perspective view of lens driving device 1 as viewed from a position shifted 180 degrees around the Z axis from the state of FIG. 6. As illustrated in FIG. 5 and FIG. 6, lens driving device 1 includes OIS movable part 10 (also referred to as movable part), OIS fixing part 20 (also referred to as fixing part), suspension wire 30 (suspension wires 30A to 30D) and the like.

(OIS Movable Part)

OIS movable part 10 includes an OIS magnet part serving as a component of the OIS voice coil motor, and sways in a plane orthogonal to the optical axis at the time of shake correction. OIS fixing part 20 includes an OIS coil part. That is, the OIS driving part of lens driving device 1 is of a moving magnet type. OIS movable part 10 is also an "AF unit" including the AF driving part.

OIS movable part 10 is disposed on the + side in the Z direction relative to OIS fixing part 20 and is separated from OIS fixing part 20. OIS movable part 10 is coupled with OIS fixing part 20 through OIS supporting part 30.

To be more specific, OIS supporting part 30 is composed of four suspension wires extending along the Z direction (hereinafter referred to as suspension wires 30). One ends (lower ends) of suspension wires 30 are fixed to OIS fixing part 20 (to be more specific, first wire connecting part 260 and second wire connecting part 265 of lead 26; see FIG. 7 and FIG. 8), and the other ends (upper ends) thereof are fixed to OIS movable part 10 (to be more specific, upper elastic supporting part 13; see FIG. 9). OIS movable part 10 is supported by suspension wire 30 such that OIS movable part 10 can sway in the plane orthogonal to the optical axis.

In the present embodiment, suspension wire 30A, of four suspension wires 30, disposed at the first corner part and suspension wire 30B, of four suspension wires 30, disposed at the second corner part are used as power feeding paths to an AF control part (not illustrated).

On the other hand, suspension wire 30C disposed at the third corner part and suspension wire 30D disposed at the fourth corner part are used as signal paths for transmitting a control signal to the AF control part (not illustrated). It is to be noted that the number of suspension wires 30 is not limited to this, and may be greater than four, for example.

Now OIS movable part 10 is described with reference to FIG. 5 to FIG. 17. OIS movable part 10 (also referred to as AF unit) includes AF movable part 11, AF fixing part 12, upper elastic supporting part 13, lower elastic supporting part 14 and the like as illustrated in FIG. 5, FIG. 6, FIG. 9A and FIG. 9B.

(AF Movable Part)

AF movable part 11 is separated from AF fixing part 12 inside AF fixing part 12 in the radial direction. AF movable part 11 is coupled with AF fixing part 12 by upper elastic supporting part 13 and lower elastic supporting part 14.

AF movable part 11 includes a coil part of an AF voice coil motor, and moves with respect to AF fixing part 12 in the Z direction (light axis direction) at the time of focusing. AF fixing part 12 includes a magnet part of the AF voice coil motor. That is, the AF driving part of lens driving device 1 is of a moving coil type.

AF movable part 11 includes lens holder 110 and AF coil part 111 (see FIG. 7 and FIG. 8).

(Lens Holder)

Lens holder 110 includes cylindrical lens housing part 110a. Preferably, the inner periphery surface of lens housing part 110a is provided with a groove (not illustrated) to which adhesive agent is applied. A method of screwing a lens part (not illustrated) to lens housing part 110a might damage suspension wire 30 that supports OIS movable part 10.

In contrast, in the present embodiment, damaging of suspension wire 30 at the time when the lens part is attached can be prevented since a lens part (not illustrated) is fixed to the inner periphery surface of lens housing part 110a by bonding. In addition, the inner periphery surface of lens housing part 110a is provided with a groove, and the groove holds an appropriate amount of adhesive agent, thereby achieving a high bonding power between lens holder 110 and the lens part.

Lens holder 110 includes upper flange 110b (see FIG. 5 to FIG. 7) and lower flange 110c (see FIG. 6 and FIG. 7) protruding from the outer peripheral surface of lens housing part 110a to the outside in the radial direction. Lens holder 110 includes, in the outer peripheral surface, coil winding part 110d having a groove form that is continuous over the entire circumference between upper flange 110b and lower flange 110c (see FIG. 7).

That is, lens holder 110 has a bobbin structure. Each of upper flange 110b and lower flange 110c has a substantially octagonal shape in plan view.

Lens holder 110 includes upper protruding part 110e protruding to the outside in the radial direction and to the + side in the Z direction at parts (four places separated from each other in the circumferential direction) of upper flange 110b (see FIG. 5 to FIG. 7). The top surface (surface on the + side in the Z direction) of upper protruding part 110e serves as a locking part that limits the movement of AF movable part 11 to the + side in the Z direction (the light reception side in the light axis direction).

Figure 9A:
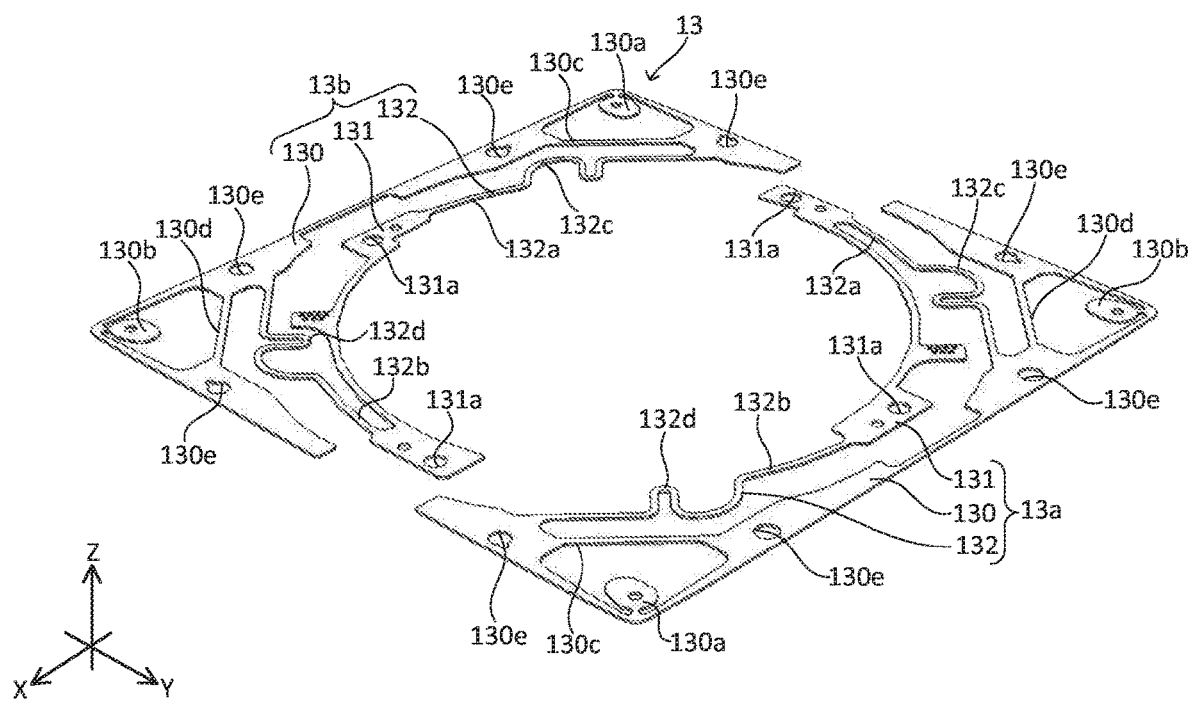
FIG. 9A is a perspective view of an upper elastic supporting part.
Figure 10A:
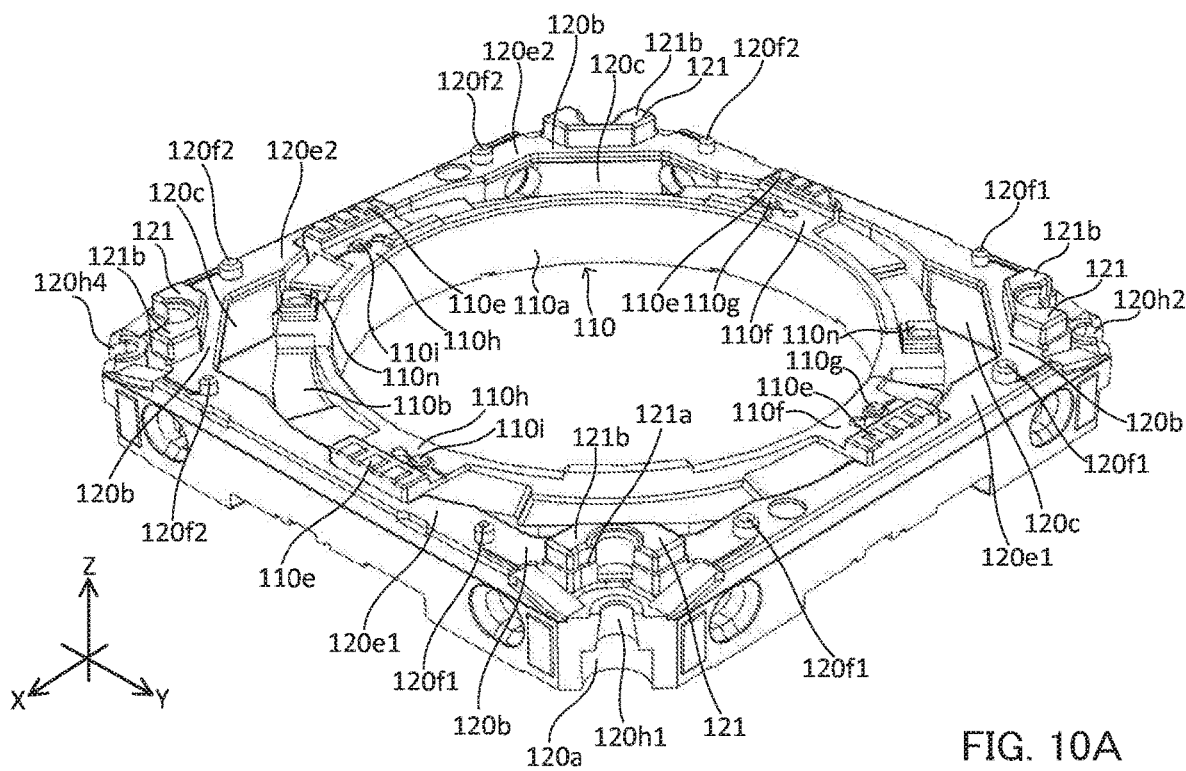
FIG. 10A and FIG. 10B are perspective views illustrating configurations of a lens holder and a magnet holder.

Lens holder 110 includes a pair of upper spring fixing parts 110f at an end portion of the − side in the X direction and an end portion of the + side in the Y direction in the surface (top surface) on the + side in the Z direction (see FIG. 10A). Each upper spring fixing part 110f includes upper boss 110g (see FIG. 5 and FIG. 10A) for positioning and fixing inner fixing part 131 of upper spring element 13a described later (see FIG. 5 and FIG. 9A).

On the other hand, lens holder 110 includes a pair of upper spring fixing parts 110h (see FIG. 10A) at an end portion of the + side in the X direction and an end portion of the − side in the Y direction in the top surface. Each upper spring fixing part 110h includes upper boss 110i (see FIG. 5 and FIG. 10A) for positioning and fixing inner fixing part 131 of upper spring element 13b described later (see FIG. 5 and FIG. 9A).

Lens holder 110 includes, in the top surface thereof, a pair of tying parts 110n at a portion (the end portion of the + side in the V direction) between the pair of upper spring fixing parts 110f in the circumferential direction, and at a portion (the end portion of the − side in the V direction) between the pair of upper spring fixing parts 110h in the circumferential direction (see FIG. 5 and FIG. 10A). In the assembled state, the pair of tying parts 110n are disposed in a gap between the top surface of lens holder 110 and the inner surface of top plate part 41 of cover 4 in the Z direction (see FIG. 2 to FIG. 4). With the configuration in which the pair of tying parts 110n are disposed in the gap, space-saving of lens holder 110 in the radial direction can be achieved.

Lens holder 110 includes lower protruding part 110j (see FIG. 6 and FIG. 10B) protruding to the outside in the radial direction and to the − side in the Z direction at parts (four places separated from each other in the circumferential direction) of lower flange 110c. The front surface (lower end surface) of lower protruding part 110j that is the end surface of lower protruding part 110j on the − side in the Z direction is opposite to the top surface (the surface on the + side in the Z direction) of coil substrate 21 of OIS fixing part 20 in the Z direction. The surface (bottom surface) of lower protruding part 110j on the − side in the Z direction serves as a locking part for limiting the movement of AF movable part 11 to the − side in the Z direction.

Figure 10B:
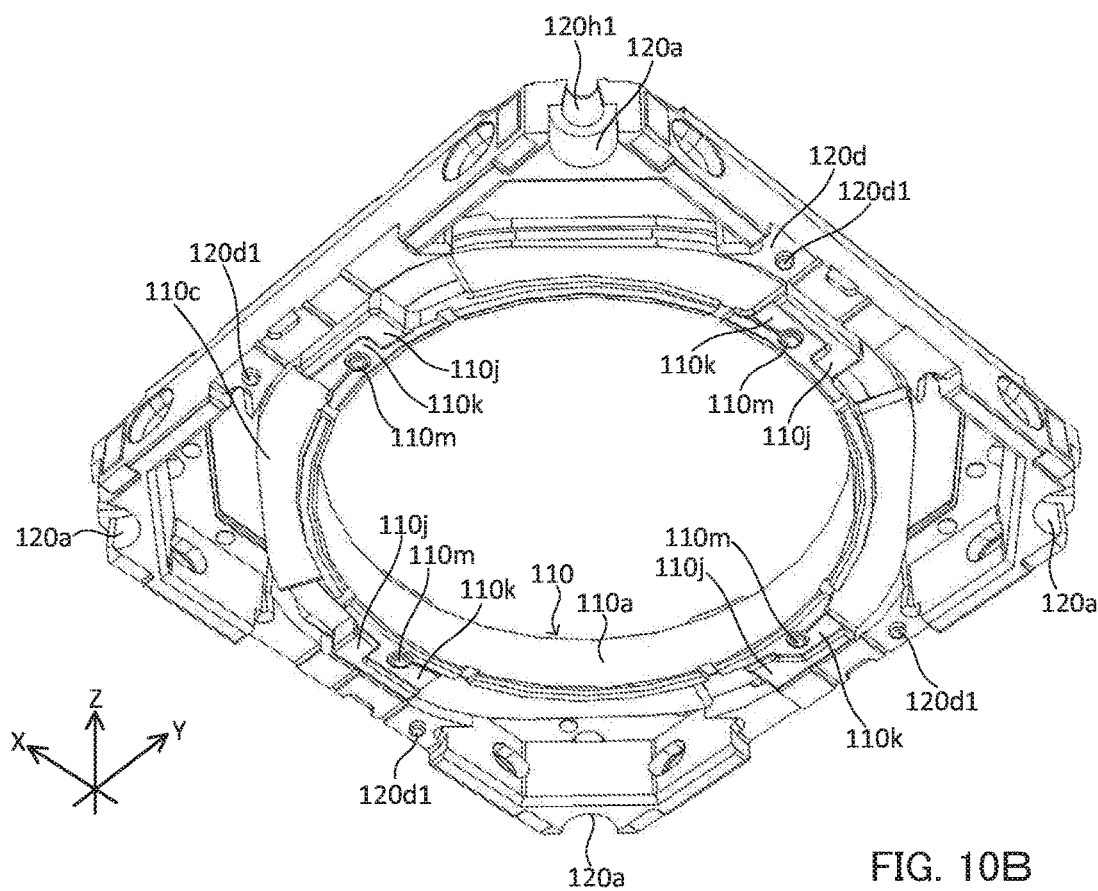

Lens holder 110 includes lower spring fixing parts 110k at positions (in the present embodiment, four positions) in the bottom surface (see FIG. 10B). Each lower spring fixing part 110k includes lower boss 110m for positioning and fixing inner fixing part 14b of lower elastic supporting part 14 (see FIG. 6 and FIG. 10B).

In the present embodiment, lens holder 110 is formed with polyarylate (PAR) or a PAR alloy composed of different types of resins including PAR (for example, PAR/PC). With this configuration, a welding power higher than that of a conventional shaping material such as liquid crystal polymer (LCP) is achieved, and accordingly toughness and impact resistance can be ensured even when lens holder 110 is thinned. Accordingly, a small external size of lens driving device 1 can be achieved, and downsizing and weight reduction can be achieved.

(AF Coil Part)

AF coil part 111 (see FIG. 7 and FIG. 8) is an air-core coil that is energized at the time of focusing, and is wound around the outer peripheral surface of coil winding part 110d of lens holder 110. One end of AF coil part 111 is tied to one tying part 110n of lens holder 110 and the other end of AF coil part 111 is tied to the other tying part 110n.

(AF Fixing Part)

AF fixing part 12 includes magnet holder 12a and magnet part 125 (see FIG. 7).

(Magnet Holder)

Magnet holder 12a has a square cylindrical shape which is square as viewed in plan view in the Z direction. Magnet holder 12a includes arc grooves 120a recessed inward in the radial direction at four corners of the outer peripheral surface (see FIG. 6). Suspension wires 30A to 30D are disposed at arc grooves 120a.

Magnet holder 12a includes four magnet cover parts 120b protruding inward in the radial direction at the end portion (upper end) on the + side in the Z direction of the four corners (see FIG. 10A). Magnet holder 12a includes magnet installation parts 120c at the four corners in the inner peripheral surface (see FIG. 10A).

Magnet holder 12a includes lower spring fixing part 120d for fixing lower elastic supporting part 14 at the end surface on the − side in the Z direction (bottom surface) (see FIG. 10B). Lower spring fixing part 120d includes a plurality of (in the present embodiment, four) lower bosses 120d1 (see FIG. 6 and FIG. 10B) for positioning and fixing outer fixing parts 14a1 to 14a4 of lower elastic supporting part 14.

Magnet holder 12a includes upper spring fixing part 120e1 (see FIG. 10A) for fixing upper spring element 13a of upper elastic supporting part 13 in a half part (that is, the half part on the + side in the Y direction) including the first corner part and the second corner part in the surface on the + side in the Z direction (top surface). Upper spring fixing part 120e1 includes four upper bosses 120f1 for positioning and fixing upper spring element 13a of upper elastic supporting part 13 (see FIG. 5 and FIG. 10A).

On the other hand, magnet holder 12a includes upper spring fixing part 120e2 for fixing upper spring element 13b of upper elastic supporting part 13 in a half part (that is, the half part on the − side in the Y direction) including the third corner part and the fourth corner part in the top surface (see FIG. 10A). Upper spring fixing part 120e2 includes four upper bosses 120f2 for positioning and fixing upper spring element 13b of upper elastic supporting part 13 (see FIG. 5 and FIG. 10A).

Upper spring fixing part 120e1 includes wire insertion parts 120h1 and 120h2 for insertion of suspension wires 30A and 30B at the corner parts (that is, the first corner part and the second corner part) (see FIG. 10A).

On the other hand, upper spring fixing part 120e2 includes wire insertion parts 120h3 and 120h4 for insertion of suspension wires 30C and 30D at the corner parts (that is, the third corner part and the fourth corner part) (see FIG. 8 and FIG. 10A).

With wire insertion parts 120h1 to 120h4, interference between suspension wire 30 and magnet holder 12a at the time when OIS movable part 10 sways can be avoided.

Magnet holder 12a includes, at the surface of each magnet cover part 120b on the + side in the Z direction (also referred to as top surface or front surface), stopper protrusion 121 protruding from the top surface to the + side in the Z direction (see FIG. 5 and FIG. 10A). In other words, in magnet holder 12a, stopper protrusions 121 are disposed in regions close to wire insertion parts 120h1 to 120h4 inside wire insertion parts 120h1 to 120h4 in the radial direction.

(Damper)

Figure 11:
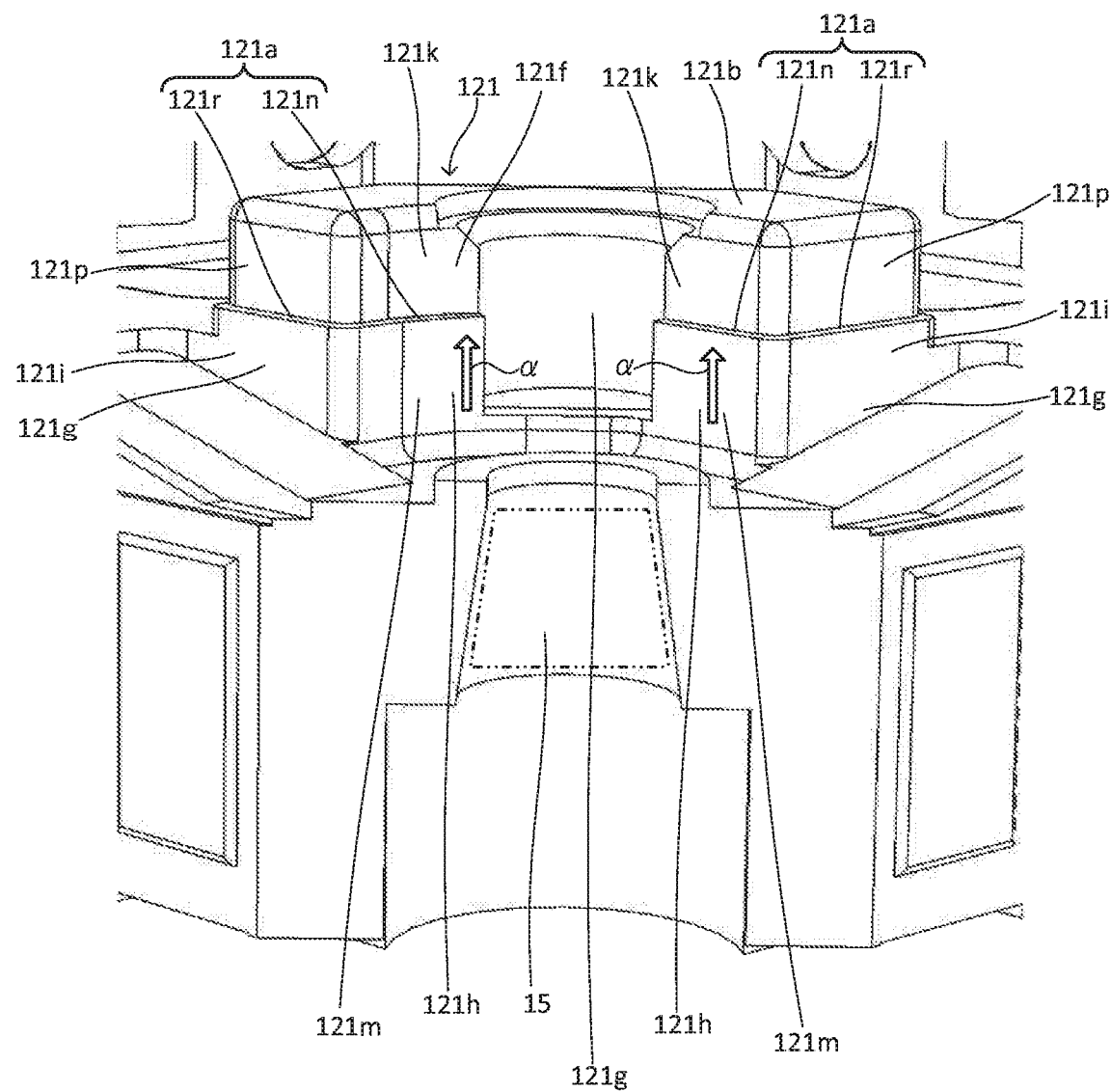
FIG. 11 illustrates a first corner part of the magnet holder as viewed from the outside in the radial direction.

In addition, damper 15 is disposed so as to surround suspension wires 30A to 30D at wire insertion parts 120h1 to 120h4 of magnet holder 12a (see FIG. 11). With damper 15 interposed between magnet holder 12a and suspension wires 30A to 30D, generation of unnecessary resonance (high-order resonance mode) is reduced, and accordingly the stability of the operation is ensured.

Damper 15 is readily applied to wire insertion parts 120h1 to 120h4 with a dispenser. Examples of damper 15 include ultraviolet curing silicone gel.

(Stopper Protrusion)

Front end surface 121b of stopper protrusion 121 (that is, the surface on the + side in the Z direction) is located over other portions of OIS movable part 10 on the + side in the Z direction. In the assembled state, front end surface 121b is opposite to a surface (bottom surface) of top plate part 41 of cover 4 on the − side in the Z direction with a predetermined gap therebetween in the Z direction.

Accordingly, when an impact is exerted on OIS movable part 10, and OIS movable part 10 is displaced to the + side in the Z direction, top plate part 41 of cover 4 makes contact with front end surface 121b before other portions make contact with front end surface 121b. In this manner, stopper protrusion 121 limits displacement of OIS movable part 10 to the + side in the Z direction to a predetermined amount.

Stopper protrusion 121 includes, in the side surface, flow stopper part 121a (such as stopper step 121n and side stopper step 121r described later; see FIGS. 5, 11, and 12). In the side surface of stopper protrusion 121, flow stopper part 121a is provided in at least a part of a surface that serves as a path of damper 15 moving to the + side in the Z direction.

Flow stopper part 121a serves as a resistance against displacement of damper 15 to the + side in the Z direction along the side surface of stopper protrusion 121. That is, flow stopper part 121a acts to prevent damper 15 from moving to the + side in the Z direction and from making contact with front end surface 121b of stopper protrusion 121.

The reason for the prevention of the contact is that, when damper 15 makes contact with front end surface 121b of stopper protrusion 121 and the bottom surface of top plate part 41 of cover 4, damper 15 might become a resistance against displacement of OIS movable part 10 in shake correction, and might reduce the accuracy of shake correction.

Figure 12:
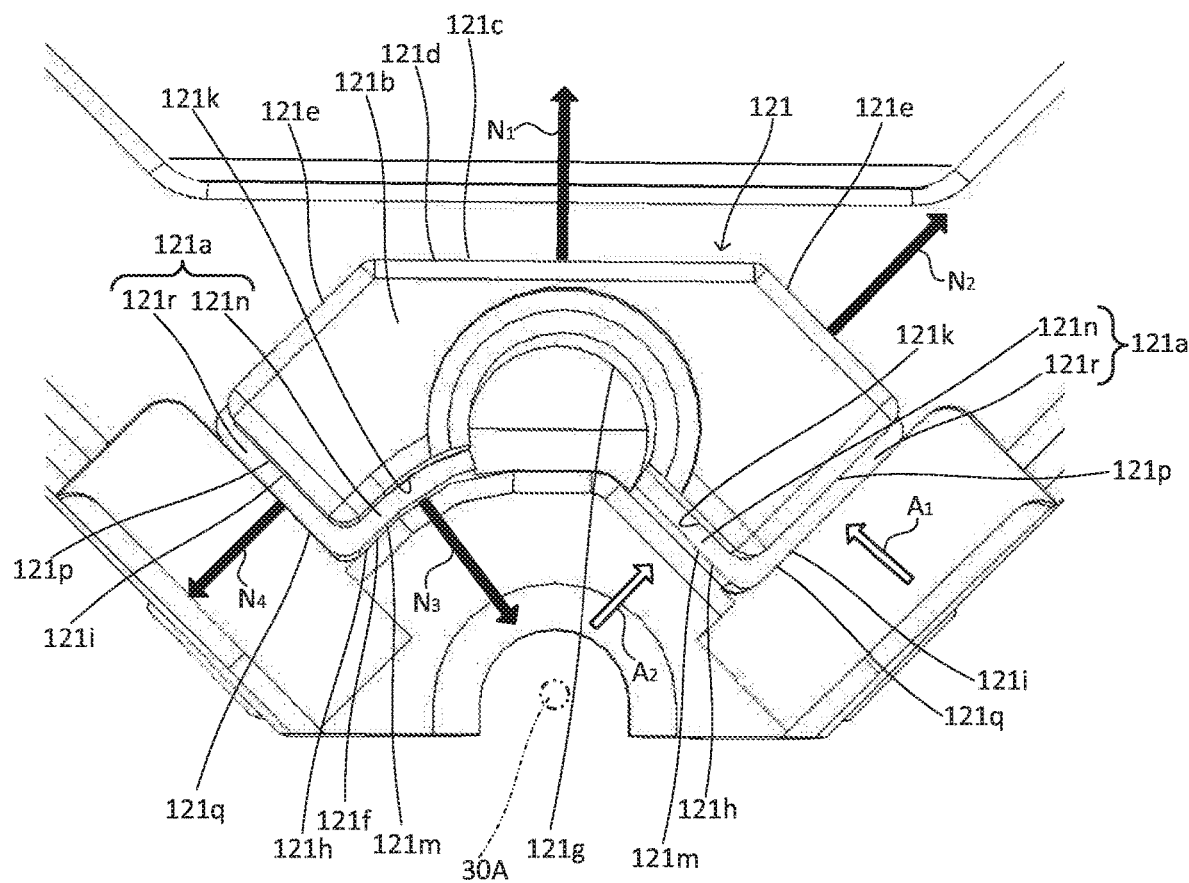
FIG. 12 illustrates the first corner part of the magnet holder as viewed from the light reception side in the light axis direction.

Now the configuration of stopper protrusion 121 is elaborated with reference to FIG. 11 and FIG. 12. FIG. 11 illustrates the first corner part of magnet holder 12a as viewed from the outside in the radial direction. FIG. 12 illustrates the first corner part of magnet holder 12a as viewed from the + side in the Z direction (the light reception side in the light axis direction).

Below, a structure of stopper protrusion 121 provided at the first corner part is described as an example. It is to be noted that the structure of each of stopper protrusions 121 provided at second corner part to the fourth corner part is similar to the structure of stopper protrusion 121 provided at the first corner part.

The structure of stopper protrusions 121 provided at the second to fourth corner parts may be appropriately understood from the following description of stopper protrusion 121 provided at the first corner part.

Stopper protrusion 121 provided at the first corner part includes front end surface 121b, inner surface 121c, and outer surface 121f. Front end surface 121b faces the + side in the Z direction.

Inner surface 121c is composed of a surface facing inside in the radial direction. It is to be noted that the surface facing inside in the radial direction is a surface whose normal vector (for example, $N_1$ and $N_2$ in FIG. 12) has a vector component toward inside in the radial direction (upper side in FIG. 12). To be more specific, inner surface 121c includes center inner surface 121d and a pair of side inner surfaces 121e. It is to be noted that inner surface 121c is provided with no step such as stopper step 121n and side stopper step 121r described later.

Outer surface 121f (also referred to as first side surface) is composed of a surface facing the outside in the radial direction. It is to be noted that the surface facing the outside in the radial direction is a surface whose normal vector (for example, $N_3$ and $N_4$ in FIG. 12) has a vector component toward the outside in the radial direction (the lower side in FIG. 12).

To be more specific, in plan view from suspension wire 30A side, outer surface 121f includes outer recessed surface 121g at a center portion in the width direction (in FIG. 11 and FIG. 12, the horizontal direction). Outer surface 121f includes a pair of wire-opposing surfaces 121h on both sides of outer recessed surface 121g in the width direction. In addition, outer surface 121f includes a pair of side outer surfaces 121i outside the pair of wire-opposing surfaces 121h in the width direction.

Each wire-opposing surface 121h is opposed to suspension wire 30A in the radial direction of suspension wire 30A. Each wire-opposing surface 121h includes first opposing surface 121k on the + side in the Z direction and second opposing surface 121m on the − side in the Z direction.

Second opposing surface 121m is located outside relative to first opposing surface 121k in the radial direction. In other words, in the radial direction, second opposing surface 121m is closer to suspension wire 30A relative to first opposing surface 121k.

Each wire-opposing surface 121h includes stopper step 121n that connects between the end portion of first opposing surface 121k on the − side in the Z direction and the end portion of second opposing surface 121m on the + side in the Z direction. Stopper step 121n serves as flow stopper part 121a. It is to be noted that stopper step 121n may be disposed in multiple positions separated in the Z direction in the pair of wire-opposing surfaces 121h.

Each outer surface 121i includes first side surface 121p on the + side in the Z direction and second side surface 121q on the − side in the Z direction.

Second side surface 121q is located outside first side surface 121p in the radial direction. Each side outer surface 121i includes side stopper step 121r that connects between the end portion of first side surface 121p on the − side in the Z direction and the end portion of second side surface 121q on the + side in the Z direction.

Together with stopper step 121n, side stopper step 121r serves as flow stopper part 121a. It is to be noted that side stopper step 121r may be provided in plural positions separated from each other in the Z direction in the pair of side outer surfaces 121i. Side stopper step 121r of the pair of side outer surfaces 121i may be omitted.

Next, with reference to FIG. 13A to FIG. 16B, modifications of flow stopper part 121a is described.

FIG. 13A and FIG. 13B describe a first modification of flow stopper part 121a.

FIG. 13A is a schematic view of a part of the stopper protrusion as viewed in the direction of arrow $A_1$ of FIG. 12, and FIG. 13B is a schematic view of a part of the stopper protrusion as viewed in the direction of arrow $A_2$ of FIG. 12.

In stopper protrusion 121A illustrated in FIG. 13A and FIG. 13B, wire-opposing surface 121h1 includes first opposing surface 121k1 on the + side in the Z direction (the upper side in FIG. 13A and FIG. 13B) and second opposing surface 121m1 on the − side in the Z direction (the lower side in FIG. 13A and FIG. 13B). Second opposing surface 121m1 is located inside first opposing surface 121k1 in the radial direction (the right side in FIG. 13A).

Each wire-opposing surface 121h1 includes stopper step 121n1 that connects between the end portion of first opposing surface 121k1 on the − side in the Z direction and the end portion of second opposing surface 121m1 on the + side in the Z direction.

Side outer surface 121i1 includes first side surface 121p1 on the + side in the Z direction and second side surface 121q1 on the − side in the Z direction. Second side surface 121q1 is located inside first side surface 121p1 in the radial direction (the left side in FIG. 13B).

Each side outer surface 121i1 includes side stopper step 121r1 that connects between the end portion of first side surface 121p1 on the − side in the Z direction and the end portion of second side surface 121q1 on the + side in the Z direction. In the present modification, stopper step 121n1 and side stopper step 121r1 serve as flow stopper part 121a.

FIG. 14A and FIG. 14B describe a second modification of flow stopper part 121a. FIG. 14A is a schematic view of a part of the stopper protrusion as viewed in the direction of arrow $A_1$ of FIG. 12, and FIG. 14B is a schematic view of a part of the stopper protrusion as viewed in the direction of arrow $A_2$ of FIG. 12.

In stopper protrusion 121B illustrated in FIG. 14A and FIG. 14B, wire-opposing surface 121h2 includes, at a center part in the Z direction (in FIG. 14A and FIG. 14B, the vertical direction), flow stopper protrusion 121s1 extending in the width direction of wire-opposing surface 121h2 (in FIG. 14B, the horizontal direction).

Side outer surface 121i2 includes, at a center part in the Z direction, side flow stopper protrusion 121s2 extending in the width direction of side outer surface 121i2 (in FIG. 14A, the horizontal direction). In the present modification, flow stopper protrusion 121s1 and side flow stopper protrusion 121s2 serve as flow stopper part 121a. It is to be noted that the positions, sizes, numbers and the like of flow stopper protrusion 121s1 and side flow stopper protrusion 121s2 are not limited to those of the present modification.

FIG. 15A and FIG. 15B describe a third modification of flow stopper part 121a. FIG. 15A is a schematic view of a part of the stopper protrusion as viewed in the direction of arrow $A_1$ of FIG. 12, and FIG. 15B is a schematic view of a part of the stopper protrusion as viewed in the direction of arrow $A_2$ of FIG. 12.

In stopper protrusion 121C illustrated in FIG. 15A and FIG. 15B, wire-opposing surface 121h3 includes, at a center part in the Z direction, flow stopper groove 121t1 extending in the width direction of wire-opposing surface 121h3 (in FIG. 15B, the horizontal direction).

Side outer surface 121i3 includes, at a center part in the Z direction, side flow stopper groove 121t2 extending in the width direction of side outer surface 121i3 (in FIG. 15A, the horizontal direction). In the present modification, flow stopper groove 121t1 and side flow stopper groove 121t2 serve as flow stopper part 121a. It is to be noted that the positions, sizes, numbers and the like of flow stopper groove 121t1 and side flow stopper groove 121t2 are not limited to those of the present modification.

FIG. 16A and FIG. 16B describe a fourth modification of flow stopper part 121a. FIG. 16A is a schematic view of a part of the stopper protrusion as viewed in the direction of arrow $A_1$ of FIG. 12, and FIG. 16B is a schematic view of a part of the stopper protrusion as viewed in the direction of arrow $A_2$ of FIG. 12.

In stopper protrusion 121D illustrated in FIG. 16A and FIG. 16B, wire-opposing surface 121h4 includes, at a center part (in FIG. 16B, the oblique grid pattern) in the Z direction (in FIG. 16B, the vertical direction), grain formation part 121u1 having a pattern of projections and depressions such as wrinkles is formed over the entire length in the width direction of wire-opposing surface 121h4 (in FIG. 16B, the horizontal direction).

Side outer surface 121i4 includes, at a center part in the Z direction (FIG. 16A the oblique grid pattern), side grain formation part 121u2 having a pattern of projections and depressions such as wrinkles is formed over the entire length in the width direction of side outer surface 121i4 (in FIG. 16A, the horizontal direction).

In the present modification, grain formation part 121u1 and side grain formation part 121u2 serve as flow stopper part 121a. The pattern of projections and depressions of grain formation part 121u1 and side grain formation part 121u2 may be appropriately set. The positions, sizes, numbers and the like of grain formation part 121u1 and side grain formation part 121u2 are not limited to those of the present modification. The above-described structures of flow stopper parts 121a may be appropriately combined.

In the present embodiment, as with lens holder 110, magnet holder 12a is formed with polyarylate (PAR) or a PAR alloy composed of different types of resins including PAR (for example, PAR/PC).

With this configuration, a high welding power can be achieved, and thus toughness and impact resistance can be ensured even when magnet holder 12a is thinned. Accordingly, a small external size of lens driving device 1 can be achieved, and downsizing and weight reduction can be achieved.

(Magnet Part)

Magnet part 125 includes four rectangular columnar permanent magnets, 125A to 125D. Permanent magnets 125A to 125D are fixed to magnet installation part 120c by bonding, for example. In the present embodiment, in plan view, each of permanent magnets 125A to 125D has a substantially isosceles trapezoidal shape.

Figure 17:
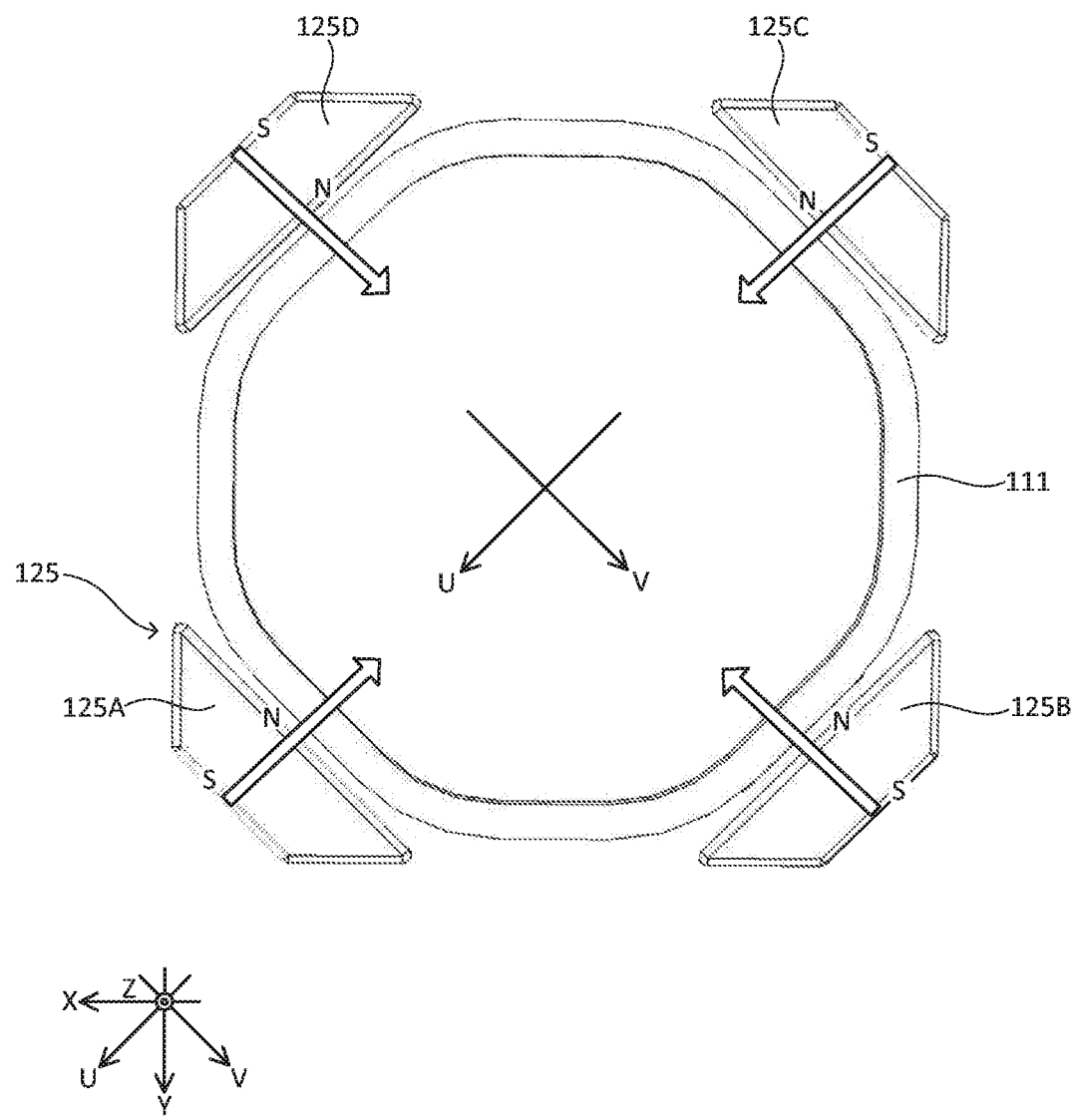
FIG. 17 is a plan view illustrating an orientation of a magnetic field in an AF movable part.

With this configuration, the corner spaces of magnet holder 12a (to be more specific, magnet installation part 120c) can be effectively utilized. As illustrated in FIG. 17, permanent magnets 125A to 125D are magnetized such that a traversing magnetic field in the radial direction is formed at AF coil part 111. In the present embodiment, permanent magnets 125A to 125D are magnetized such that the inner periphery side and the outer periphery side thereof are set to N pole and S pole, respectively.

The end surfaces (bottom surfaces) of permanent magnets 125A to 125D on the − side in the Z direction protrude to the − side in the Z direction over magnet holder 12a (see FIG. 6). That is, the height of OIS movable part 10 is defined by permanent magnets 125A to 125D. With this configuration, the height of OIS movable part 10 can be minimized in accordance with the size of permanent magnets 125A to 125D for ensuring the magnetic force, and thus height reduction of lens driving device 1 can be achieved.

The AF voice coil motor is configured with magnet part 125 and AF coil part 111 with the above-mentioned configuration. In addition, magnet part 125 serves as the AF magnet part and as the OIS magnet part.

(Upper Elastic Supporting Part)

As illustrated in FIG. 9A, upper elastic supporting part 13 (hereinafter referred to as "upper leaf spring 13") is composed of a pair of upper spring elements 13a and 13b. Each of upper spring elements 13a and 13b is a leaf spring made of beryllium copper, nickel copper, or stainless-steel or the like, for example.

Regarding upper spring elements 13a and 13b, upper spring element 13a includes outer fixing part 130 configured to be fixed to the surface of magnet holder 12a on the + side in the Z direction (to be more specific, upper spring fixing part 120e1), and inner fixing part 131 configured to be fixed to the surface of lens holder 110 on the + side in the Z direction (to be more specific, upper spring fixing part 110f). It is to be noted that the structure of upper spring element 13b is similar to the structure of upper spring element 13a. In view of this, the parts of upper spring element 13b similar to those of upper spring element 13a are denoted with the same reference numerals as those of upper spring element 13a, and detailed description thereof is omitted.

Outer fixing part 130 and inner fixing part 131 can be relatively displaced in the Z direction. To achieve such relative displacement, in the present embodiment, upper spring element 13a includes displacement allowance part 132 that allows for relative displacement of outer fixing part 130 and inner fixing part 131 based on the elastic deformation thereof.

To be more specific, outer fixing part 130 includes a pair of wire fixing parts 130a and 130b. Wire fixing parts 130a and 130b are disposed on the + side, in the Z direction, of arc grooves 120a of magnet holder 12a (see FIG. 6) where suspension wires 30A and 30B are disposed (that is, on the + side of the first corner part and the second corner part in the Z direction). In upper spring element 13b, wire fixing parts 130a and 130b are disposed on the + side, in the Z direction, of arc grooves 120a of magnet holder 12a where suspension wires 30C and 30D are disposed (that is, on the + side of the third corner part and the fourth corner part in the Z direction).

Then, the other ends (upper ends) of suspension wires 30A and 30B (in the case of upper spring element 13b, suspension wires 30C and 30D) are fixed to wire fixing parts 130a and 130b by soldering.

Outer fixing part 130 includes a pair of first outer through holes 130c and 130d to which stopper protrusions 121 of magnet holder 12a are inserted.

Further, outer fixing part 130 includes a plurality of (the present embodiment, four) second outer through holes 130e to which upper bosses 120f1 (in the case of upper spring element 13b, upper bosses 120f2) of magnet holder 12a are inserted.

Inner fixing part 131 is disposed inside outer fixing part 130 in the radial direction. Inner fixing part 131 includes a pair of inner through holes 131a to which upper bosses 110g (in the case of upper spring element 13b, upper bosses 110i) of lens holder 110 is inserted.

Displacement allowance part 132 is composed of a pair of displacement permission elements 132a and 132b. Displacement permission elements 132a and 132b are slender members extending in the circumferential direction, and connect between inner fixing part 131 and outer fixing part 130. Displacement permission elements 132a and 132b include therein meandering parts 132c and 132d, respectively.

It is to be noted that the pair of upper spring elements 13a and 13b is connected to AF coil part 111 by soldering at the pair of tying parts 110n.

(Lower Elastic Supporting Part)

Figure 9B:
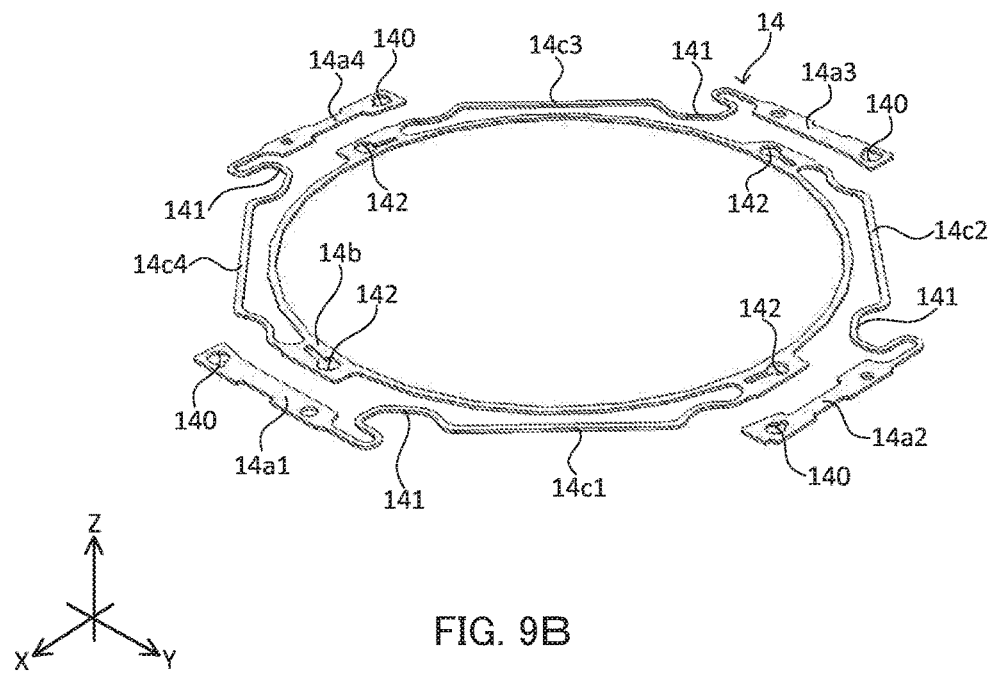
FIG. 9B is a perspective view of a lower elastic supporting part.

As illustrated in FIG. 9B, lower elastic supporting part 14 (hereinafter referred to as "lower leaf spring 14"), as with upper leaf spring 13, is a leaf spring made of beryllium copper, nickel copper, stainless-steel or the like for example, and has a square shape in its entirety in plan view. Lower leaf spring 14 elastically supports AF movable part 11 with respect to AF fixing part 12.

Lower leaf spring 14 includes four outer fixing parts 14a1 to 14a4 configured to be fixed to magnet holder 12a (to be more specific, lower spring fixing part 120d), and inner fixing part 14b configured to be fixed to lens holder 110 (to be more specific, lower spring fixing parts 110k).

Outer fixing parts 14a1 to 14a4 and inner fixing part 14b can be relatively displaced in the Z direction. To achieve such relative displacement, in the present embodiment, lower leaf spring 14 includes displacement allowance parts 14c1 to 14c4 that allow for relative displacement of outer fixing parts 14a1 to 14a4 and inner fixing part 14b based on the elastic deformation thereof.

To be more specific, each of outer fixing parts 14a1 to 14a4 includes outer through hole 140 to which lower boss 120d1 of magnet holder 12a is inserted. It is to be noted that the structure of outer fixing part is not limited to that of the present embodiment.

Inner fixing part 14b has a circular shape, and disposed inside outer fixing parts 14a1 to 14a4 in the radial direction. Inner fixing part 14b having such a configuration includes, at four places shifted from each other by 90 degrees in the circumferential direction, inner through hole 142 to which lower boss 110m of lower spring fixing part 110k of lens holder 110 is inserted.

It is to be noted that, in the present embodiment, inner through holes 142 and outer fixing parts 14a1 to 14a4 are disposed in a positional relationship in substantially the same phase in the circumferential direction. It is to be noted that the structure of the inner fixing part is not limited to that of the present embodiment.

Each of displacement allowance parts 14c1 to 14c4 is a slender member extending in the circumferential direction, and connects between outer fixing parts 14a1 to 14a4 and inner fixing part 14b. Each of displacement allowance parts 14c1 to 14c4 includes therein meandering part 141.

To be more specific, one end (also referred to as inner end in the radial direction) of each of displacement allowance parts 14c1 to 14c4 is connected with a portion near a portion where inner through hole 142 is provided in inner fixing part 14b. On the other hand, the other ends (in the radial direction outer end also referred to as) of displacement allowance parts 14c1 to 14c4 are respectively connected with outer fixing parts 14a1 to 14a4 provided at positions shifted from each other by approximately 90 degrees from the portion where one ends of displacement allowance parts 14c1 to 14c4 are fixed.

(OIS Fixing Part)

Figure 18:
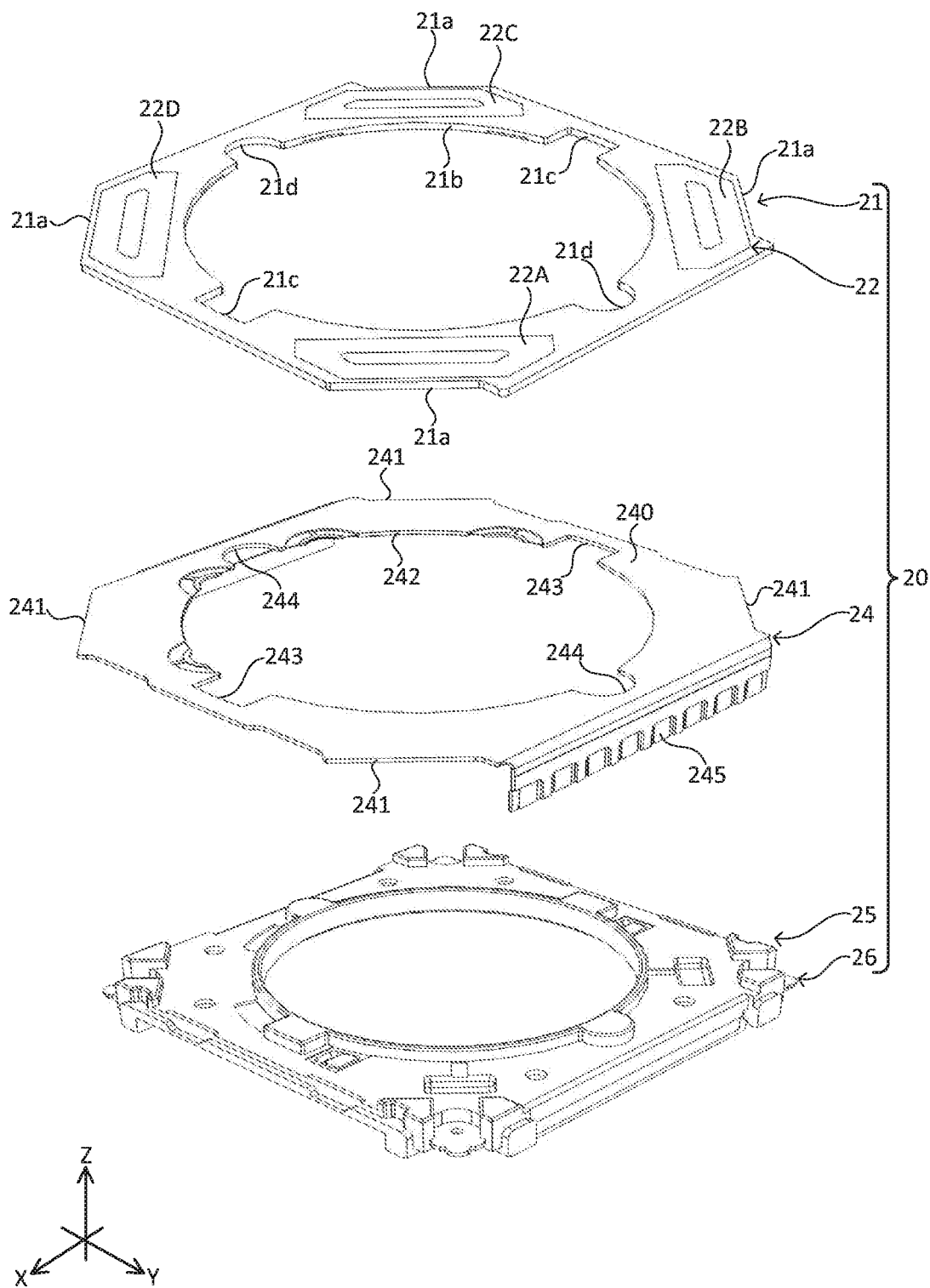
FIG. 18 is an exploded perspective view of an OIS fixing part.
Figure 19:
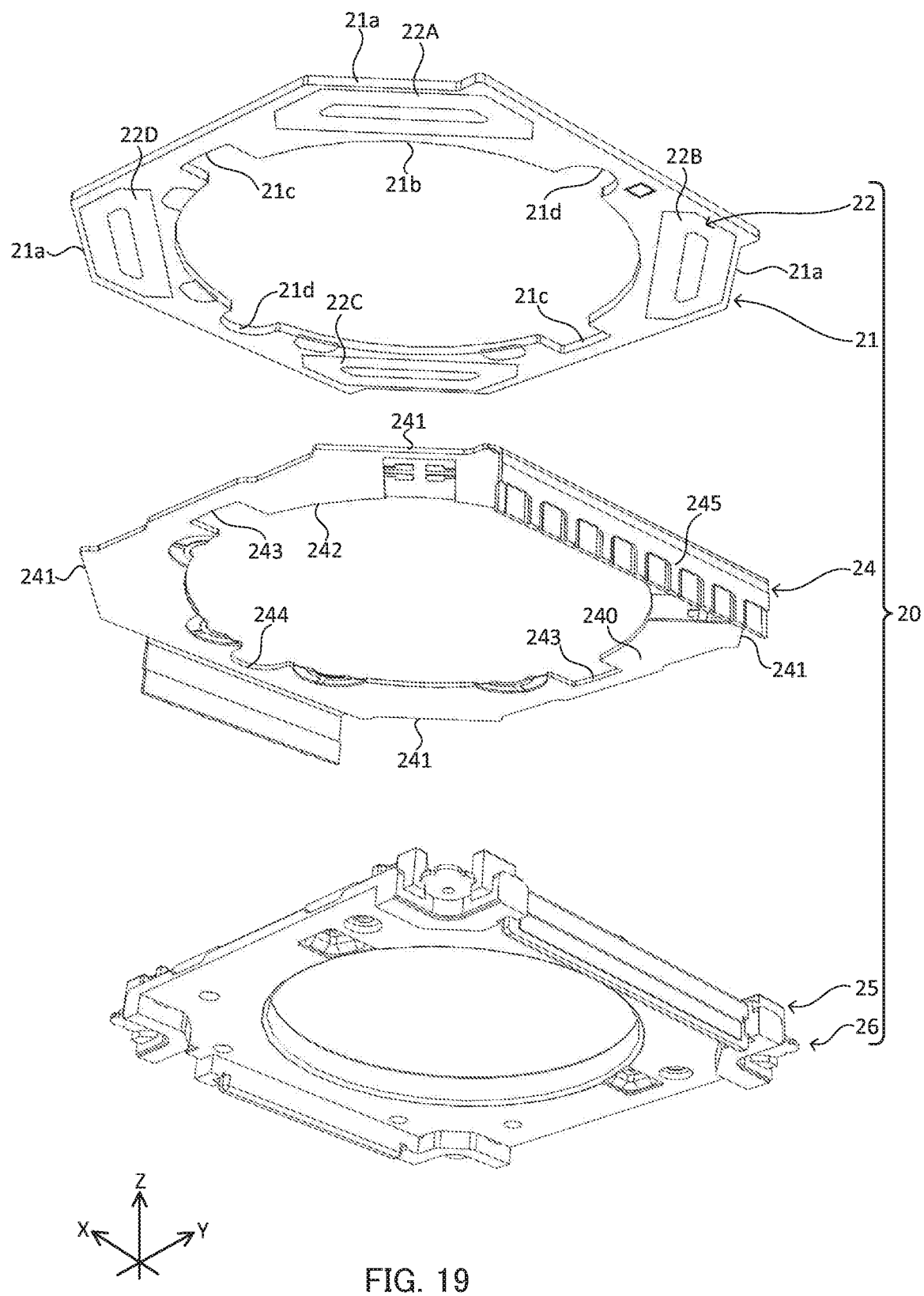
FIG. 19 is an exploded perspective view of the OIS fixing part as viewed at a different angle than FIG. 18.

FIG. 18 and FIG. 19 are exploded perspective views of OIS fixing part 20. As illustrated in FIG. 18 and FIG. 19, OIS fixing part 20 includes coil substrate 21, FPC 24, base member 25, lead 26, and the like.

(Coil Substrate)

Coil substrate 21 is a substrate having a substantially octagonal shape in plan view with chamfered parts 21a at the four corners thereof. Center parts of suspension wires 30A to 30D are located outside chamfered parts 21a in the radial direction. Accordingly, suspension wires 30A to 30D are not locked by coil substrate 21.

Coil substrate 21 includes circular opening 21b at the center thereof. Coil substrate 21 includes a pair of first cutouts 21c at portions opposite to each other in the first direction (for example, the X direction) at the inner peripheral edge of opening 21b.

In addition, oil substrate 21 includes a pair of first cutouts 21d at portions opposite to each other in the second direction (for example, the Y direction) at the inner peripheral edge of opening 21b. That is, first cutouts 21c and second cutouts 21d are alternately provided in the circumferential direction at intervals of 90 degrees at the inner peripheral edge of opening 21b.

Each first cutout 21c has a rectangular shape as viewed in plan view in the Z direction. On the other hand, each second cutout 21d has a semicircular shape as viewed in plan view in the Z direction. First cutouts 21c and second cutouts 21d are configured to position coil substrate 21 with respect to base member 25 described later.

Coil substrate 21 includes OIS coil part 22 at positions opposite to magnet parts 125 (see FIG. 7 and FIG. 8) in the Z direction (light axis direction). OIS coil part 22 includes four OIS coils, 22A to 22D, corresponding to permanent magnets 125A to 125D.

The sizes and/or installation positions of OIS coils 22A to 22D and permanent magnets 125A to 125D are set such that the magnetic fields radiated from the bottom surfaces of permanent magnets 125A to 125D respectively traverse the long side portions of OIS coils 22A to 22D in the Z direction. Magnet part 125 and OIS coil part 22 serve as an OIS voice coil motor.

(FPC)

As illustrated in FIG. 18 and FIG. 19, as with coil substrate 21, FPC 24 includes FPC main body 240 having a substantially octagonal shape in plan view with chamfered parts 241 at four corners thereof. Center parts of suspension wires 30A to 30D are located outside chamfered parts 241 in the radial direction. Accordingly, suspension wires 30A to 30D are not locked by FPC 24.

FPC main body 240 includes, at the center thereof, circular opening 242. FPC main body 240 includes a pair of first cutouts 243 at two portions opposite to each other in the first direction (for example, the X direction) at the inner peripheral edge of opening 242.

In addition, FPC main body 240 includes a pair of second cutouts 244 at two portions opposite to each other in the second direction (for example, the Y direction) at the inner peripheral edge of opening 242. That is, first cutouts 243 and second cutouts 244 are alternately provided at intervals of 90 degrees in the circumferential direction at the inner peripheral edge of opening 21b.

Each first cutout 243 has a rectangular shape as viewed in plan view in the Z direction. On the other hand, each second cutout 244 has a semicircular shape as viewed in plan view in the Z direction. First cutouts 243 and second cutouts 244 are configured to position FPC 24 with respect to base member 25 described later.

FPC 24 includes a pair of terminal parts 245 at two sides opposite to each other in the first direction (for example, the Y direction) in FPC main body 240, and terminal parts 245 are bent downward from the two sides. A power source terminal and a signal terminal are disposed at the pair of terminal parts 245.

(Base Member)

Figure 20A:
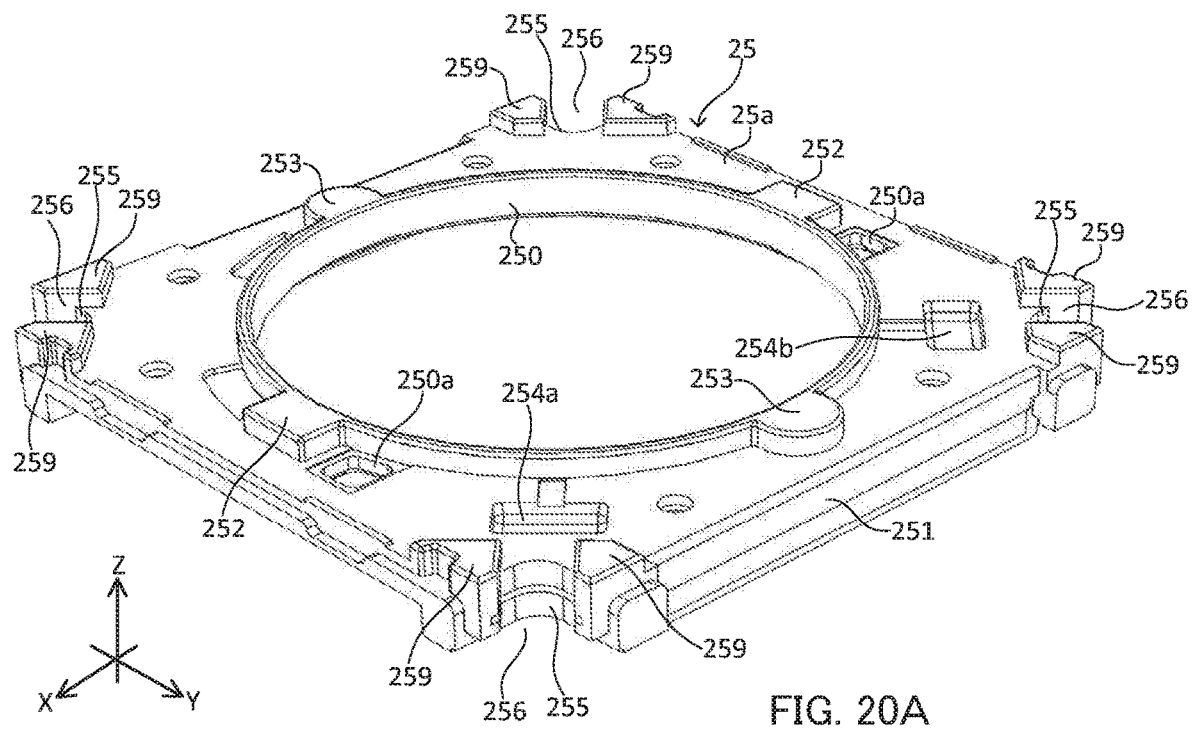
FIG. 20A and FIG. 20B are exploded perspective views of a base member and a lead.
Figure 20B:
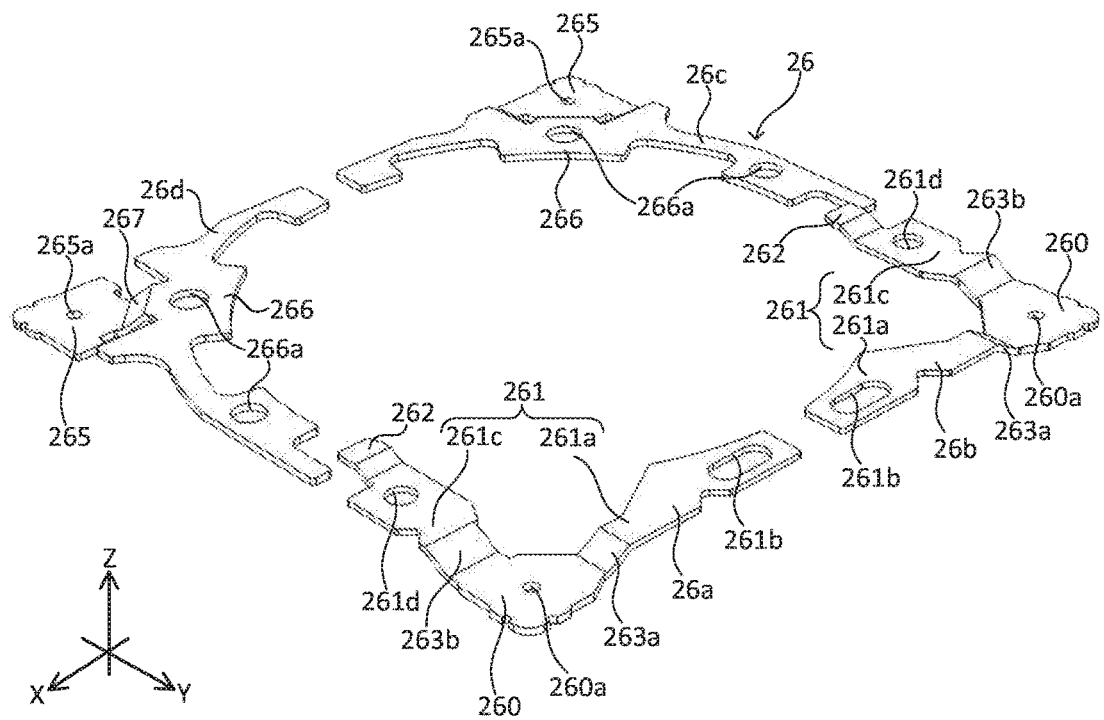
Figure 21A:
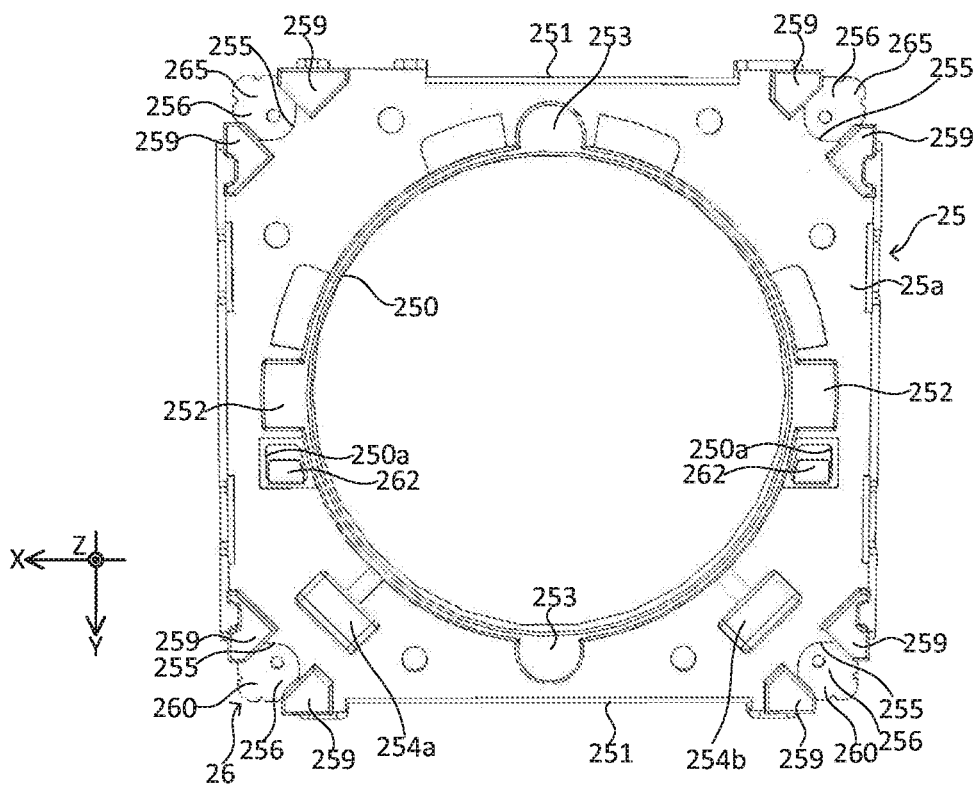
FIG. 21A illustrates a configuration of the base.
Figure 21B:
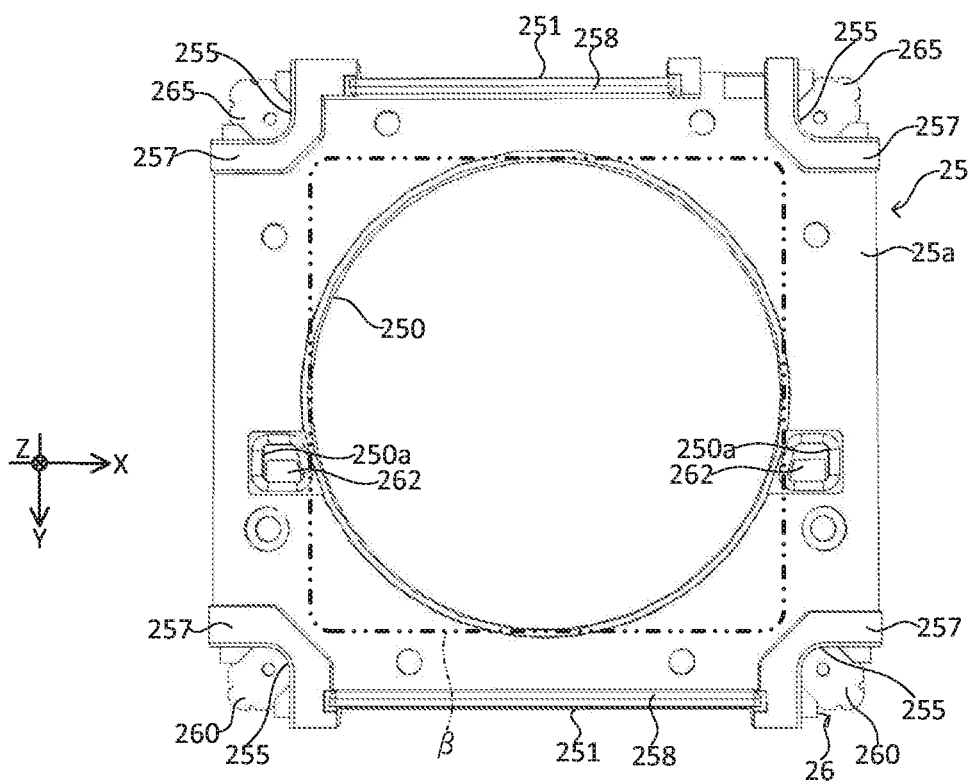
FIG. 21B illustrates a configuration of the base as viewed at a different angle than FIG. 21A.

FIG. 20A is a perspective view of base member 25, and FIG. 20B is a perspective view of lead 26. Base member 25 is a supporting member that supports coil substrate 21. FIG. 21A is a plan view of base member 25 in which lead 26 is embedded, and FIG. 21B is a bottom view of base member 25 in which lead 26 is embedded.

Base member 25 is made of a non-conductive material such as synthetic resins. For example, base member 25 is made of liquid crystal polymer (LCP), and includes base main body 25a that is a plate member having a substantially square shape in plan view.

Base main body 25a includes, at the peripheral surface thereof, a pair of terminal attaching portions 251 at positions corresponding to the pair of terminal parts 245.

Base main body 25a includes circular opening 250 at the center thereof. Base main body 25a includes first protrusions 252 at two positions opposite to each other in the first direction (for example, the X direction) at the periphery of opening 250.

First protrusion 252 has a rectangular shape as viewed in plan view in the Z direction. At first protrusion 252, first cutout 21c of coil substrate 21 and first cutout 243 of FPC 24 are locked in this order from the + side in the Z direction.

In addition, base main body 25a includes second protrusions 253 at two positions opposite to each other in the second direction (for example, the Y direction) at the periphery of opening 250. Second protrusion 253 has a semicircular shape as viewed in plan view in the Z direction. At second protrusion 253, second cutout 21d of coil substrate 21 and second cutout 244 of FPC 24 are locked in this order from the + side in the Z direction.

Base main body 25a includes Hall-device recesses 254a and 254b at two corners on + side in the Y direction on the surface on the + side in the Z direction (top surface) (that is, the first corner part and the second corner part). In the assembled state, Hall-device recesses 254a and 254b are located on the − side in the Z direction of OIS coils 22A and 22B on + side in the Y direction of OIS coils 22A to 22D.

Hall devices 23A and 23B (see FIG. 8) are housed in Hall-device recesses 254a and 254b. Hall devices 23A and 23B are disposed on the surface (rear surface) of FPC 24 on the − side in the Z direction. By detecting the magnetic field formed by magnet part 125 with Hall devices 23A and 23B, the position of OIS movable part 10 in the plane orthogonal to the optical axis can be specified.

Base main body 25a includes a pair of through holes 250a extending through base main body 25a in the Z direction at positions on both sides of opening 250 in the X direction. Conduction pieces 262 of first lead elements 26a and 26b of lead 26 described later are disposed at through holes 250a.

Base main body 25a includes at the four corners thereof lead cutout parts 255 (also referred to as cutout parts) recessed inward in the radial direction. Lead installation spaces 256 are defined at portions surrounded by lead cutout parts 255. Lead installation spaces 256 open to both sides in the Z direction, and to the outside in the radial direction.

Base main body 25a includes, on the top surface thereof, pairs of first reinforcement ribs 259 at the peripheries of lead cutout parts 255.

Base main body 25a includes, on the surface (bottom surface) on the − side in the Z direction, base leg parts 257 protruding from the bottom surface to the − side in the Z direction at the peripheries of lead cutout parts 255. Each base leg part 257 has a substantially L-shape as viewed in plan view in the Z direction, and the outer surface of base leg part 257 in the radial direction is continuous with the outer surface of lead cutout part 255 in the Z direction.

The end portion (front end portion) on the − side in the Z direction of base leg part 257 is located on the − side in the Z direction relative to base main body 25a. A half part of lead installation space 256 on the − side in the Z direction is formed in a portion surrounded by base leg part 257. With base leg part 257, lead installation space 256 can be expanded to the − side in the Z direction in comparison with a configuration in which no base leg part 257 is provided.

In addition, in the assembled state, base leg part 257 can be lengthened to the − side in the Z direction as long as base leg part 257 does not make contact with the sensor substrate of the image pickup part.

Base main body 25a includes, on the surface (bottom surface) of base main body 25a on the − side in the Z direction, second base leg parts 258 protruding from the bottom surface to the − side in the Z direction at positions along the two sides opposite to each other in the first direction (for example, the Y direction). The position of the end surface (end surface) of each second base leg part 258 on the − side in the Z direction is located on the − side in the Z direction relative to the end surface of base leg part 257.

Each of first reinforcement ribs 259, base leg parts 257, and second base leg parts 258 increases the mechanical strength of base main body 25a. Thus, reduction in the thickness of base main body 25a can be achieved.

Base main body 25a is attached to cover 4 by applying an adhesive agent (for example, epoxy resin) to a portion surrounded by base leg part 257 in lead installation space 256.

It is to be noted that in the assembled state of camera module A, the imaging device (not illustrated) held by the sensor base (not illustrated) is disposed at the position indicated with the chain double-dashed line 13 on the − side of base main body 25a in the Z direction in FIG. 21B. The sensor base having the above-mentioned configuration is fixed to the top surface (the surface on the + side in the Z direction) of the sensor substrate (not illustrated). In such an assembled state, the end surface (the surface on the − side in the Z direction) of base leg part 257 of base member 25 does not make contact with the sensor substrate.

(Lead)

Figure 22:
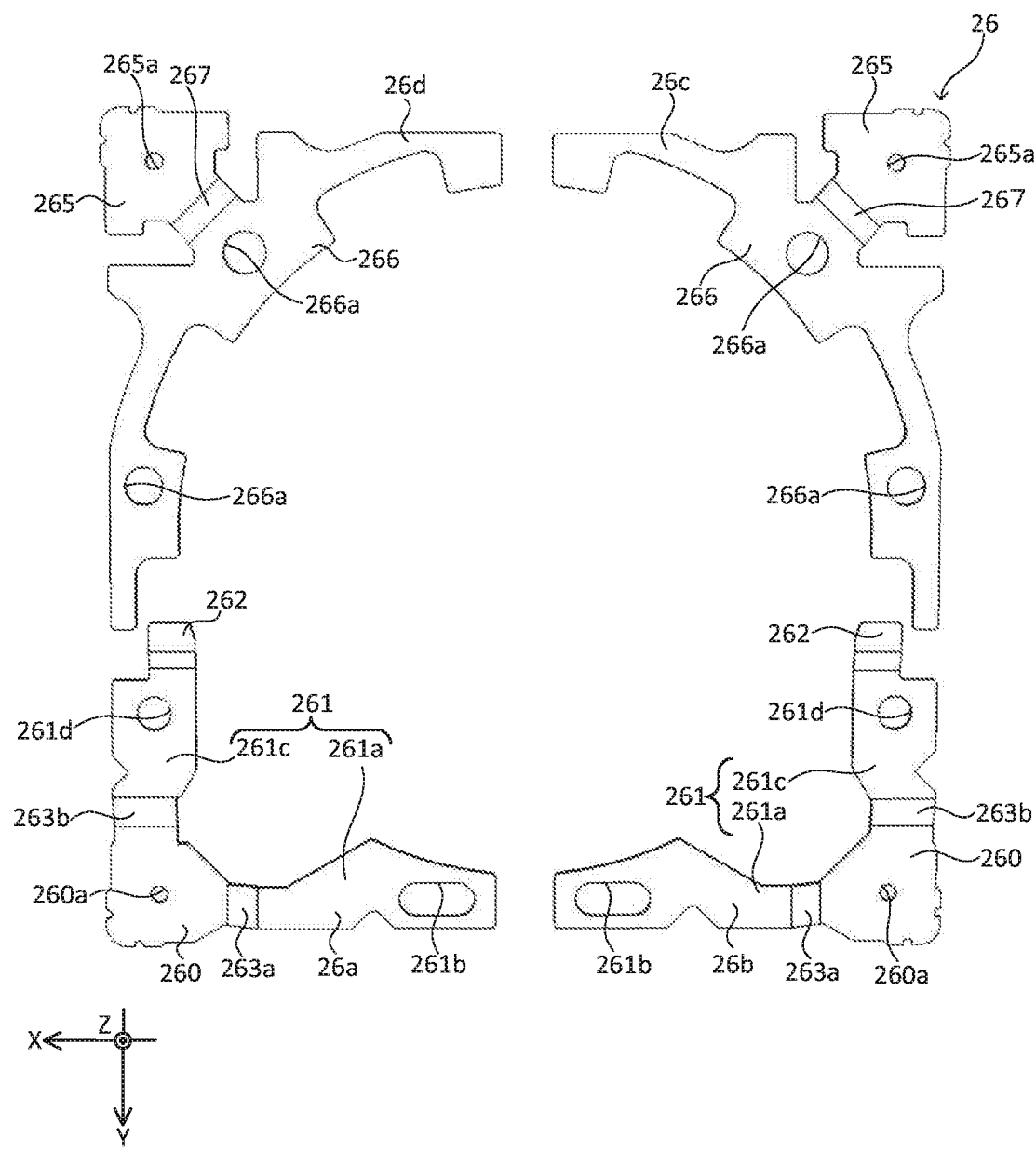
FIG. 22 is a plan view of the lead.

As illustrated in FIG. 20B and FIG. 22, lead 26 (also referred to as wire connecting part) is, for example, a leaf spring made of a conductive material such as beryllium copper, nickel copper, and stainless-steel, and includes a main body part (for example, first lead main body 261 and second lead main body 266 described later) and a plurality of (in the present embodiment, four) wire connecting parts (for example, first wire connecting part 260 and second wire connecting part 265 described later).

The main body part is embedded in base member 25. On the other hand, each wire connecting part is exposed from base member 25. For example, the wire connecting parts exposed from base member 25 at the first to fourth corner parts.

Each wire connecting part is located on the − side in the Z direction relative to the main body part (or in other words, located at a position remote from OIS movable part 10). One ends (lower ends) of suspension wires 30A to 30D are fixed to respective wire connecting parts.

Now a structure of lead 26 is elaborated below with reference to FIG. 20B and FIG. 22. Lead 26 includes a pair of first lead elements 26a and 26b and a pair of second lead elements 26c and 26d, each of which has a substantially L-shape. The pair of first lead elements 26a and 26b and the pair of second lead elements 26c and 26d are disposed so as to form a frame having a substantially rectangular shape.

To be more specific, the pair of first lead elements 26a and 26b are adjacent to each other in the X direction at the first corner part and the second corner part, respectively. On the other hand, the pair of second lead elements 26c and 26d are adjacent to each other in the X direction at the third corner part and the fourth corner part, respectively.

Each of first lead elements 26a and 26b includes first wire connecting part 260 (also referred to as wire connecting part) and first lead main body 261 (also referred to as main body part).

First wire connecting parts 260 are plate members each having a substantially triangular shape as viewed in plan view in the Z direction, and include first through holes 260a through which one ends of (lower end) of suspension wires 30A and 30B can be inserted. Each first lead main body 261 includes first main body element 261a and first main body element 261c extending in directions orthogonal to each other (for example, the X direction and the Y direction) from first wire connecting part 260.

First main body element 261a includes positioning hole 261b at the front end portion thereof. A part of the resin that forms base member 25 is supplied to positioning hole 261b. The base end of first main body element 261a is connected with first wire connecting part 260 through first step 263a (also referred to as step).

First step 263a is tilted in a direction approaching first wire connecting part 260 toward the − side in the Z direction. In the present embodiment, first step 263a is embedded in base member 25. It is to be noted that first step 263a is not limited to the configuration illustrated in the drawing, and may be, for example, parallel to the Z direction. That is, first step 263a may be orthogonal to first main body element 261a and first wire connecting part 260.

On the other hand, first main body element 261c includes, at the front end portion thereof, conduction piece 262 bent to the + side in the Z direction. When disposed at through hole 250a of base member 25, conduction piece 262 is exposed at the surface of base member 25 from base member 25.

The portion exposed from base member 25 of conduction piece 262 makes contact with the power source part (not illustrated) provided at the rear surface (i.e. the surface on the − side in the Z direction) of FPC 24. With this configuration, the pair of first lead elements 26a and 26b and FPC 24 are electrically connected to each other.

First main body element 261c includes positioning hole 261d at a center part thereof. A part of the resin that forms base member 25 is supplied to positioning hole 261d. The base end of first main body element 261c is continuous with first wire connecting part 260 through first step 263b (also referred to as step).

First step 263b is tilted in a direction approaching first wire connecting part 260 toward the − side in the Z direction. In the present embodiment, first step 263b is embedded in base member 25. It is to be noted that first step 263b is not limited to the configuration illustrated in the drawing, and may be, for example, parallel to the Z direction. That is, first step 263b may be orthogonal to first main body element 261c and first wire connecting part 260.

With the above-mentioned configuration, first wire connecting part 260 is located on the − side in the Z direction relative to first lead main body 261 (that is, first main body element 261a and first main body element 261c).

First lead element 26a is disposed at the first corner part of base member 25. In such a state, first main body element 261a, first main body element 261c, first step 263a, and first step 263b of first lead element 26a are embedded in base member 25.

First wire connecting part 260 of first lead element 26a is disposed in lead installation space 256 of the first corner part of base member 25 in the state where first wire connecting part 260 is exposed from base member 25.

On the other hand, first lead element 26b is disposed at the second corner part of base member 25. In such a state, first main body element 261a, first main body element 261c, first step 263a, and first step 263b of first lead element 26b are embedded in base member 25.

First wire connecting part 260 of first lead element 26b is disposed in lead installation space 256 of the second corner part of base member 25 in the state where first wire connecting part 260 is exposed from base member 25.

Each of second lead elements 26c and 26d includes second wire connecting part 265 (also referred to as wire connecting part) and second lead main body 266 (also referred to as main body part).

Second wire connecting parts 265 are plate members each having a substantially triangular shape as viewed in plan view in the Z direction, and include second through holes 265a through which one ends (lower ends) of suspension wires 30C and 30D can be inserted.

Second lead main body 266 is a plate member having a substantially arc-like shape as viewed in plan view in the Z direction, and is disposed inside second wire connecting part 265 in the radial direction. Second lead main body 266 includes two positioning holes, 266a. A part of the resin that forms base member 25 is supplied to each positioning hole 266a.

A center part of second lead main body 266 is connected with second wire connecting part 265 through second step 267. Second step 267 is tilted in a direction approaching second wire connecting part 265 toward the − side in the Z direction. It is to be noted that second step 267 is not limited to the configuration illustrated in the drawing, and may be parallel to the Z direction for example. That is, second step 267 may be orthogonal to second lead main body 266 and second wire connecting part 265.

Accordingly, second wire connecting part 265 is located on the − side in the Z direction relative to second lead main body 266. In the present embodiment, second step 267 is embedded in base member 25.

Second lead element 26c is disposed at the third corner part in base member 25. In such a state, second lead main body 266 and second step 267 of second lead element 26c are embedded in base member 25.

Second wire connecting part 265 of second lead element 26c is disposed in lead installation space 256 of the third corner part of base member 25 in the state where second wire connecting part 265 is exposed from base member 25.

On the other hand, second lead element 26d is disposed at the fourth corner part in base member 25. In such a state, second lead main body 266 and second step 267 of second lead element 26d are embedded in base member 25.

Second wire connecting part 265 of second lead element 26d is disposed in lead installation space 256 of the fourth corner part of base member 25 in the state where second wire connecting part 265 is exposed from base member 25.

(Assembly of OIS Movable Part and OIS Fixing Part)

When OIS fixing part 20 and OIS movable part 10 having the above-mentioned configurations are combined to assemble lens driving device 1, the other ends of (upper ends) of suspension wires 30A and 30B are respectively inserted to the pair of wire fixing parts 130a and 130b of upper spring element 13a, and fixed by soldering.

In addition, the other ends (upper ends) of suspension wires 30C and 30D are respectively inserted to the pair of wire fixing parts 130a and 130b of upper spring element 13b, and fixed by soldering.

On the other hand, one ends (lower ends) of suspension wires 30A and 30B are inserted to first through holes 260a of first wire connecting part 260s of first lead elements 26a and 26b, and fixed by soldering.

In addition, one ends (lower ends) of suspension wires 30C and 30D are inserted to second through holes 265a of second wire connecting parts 265 of second lead elements 26c and 26d, and fixed by soldering.

In addition, by applying adhesive agent to the portion surrounded by base leg part 257 in lead installation space 256 of base main body 25a, base main body 25a and cover 4 are fixed to each other. The adhesive agent is applied also to the rear surfaces of first wire connecting parts 260 of first lead elements 26a and 26b and the rear surfaces of second wire connecting parts 265 of second lead elements 26c and 26d. In this state, first wire connecting part 260 and second wire connecting part 265 function as anchors, and thus the bonding power in attaching of cover 4 to base main body 25a and the dropping-impact resistance is improved.

In the above-mentioned manner, OIS movable part 10 is supported by OIS fixing part 20 with suspension wires 30A to 30D in such a manner that OIS movable part 10 can sway in the plane orthogonal to the optical axis.

At the time of shake correction in lens driving device 1, OIS coils 22A to 22D are energized. When OIS coils 22A to 22D are energized, Lorentz forces are generated at OIS coils 22A to 22D by interaction between the magnetic field of magnet part 125 and the current flowing through OIS coils 22A to 22D (Fleming's left hand rule).

The directions of the Lorentz force (the V direction or the U direction) are orthogonal to the directions of the current (the U direction or the V direction) and the directions of the magnetic field at the long side portions of OIS coils 22A to 22D (the Z direction). Since OIS coils 22A to 22D are fixed, reactive forces act on permanent magnets 125A to 125D. With the reactive forces serving as the driving force of the OIS voice coil motor, OIS movable part 10 including magnet part 125 sways in the plane orthogonal to the optical axis, and thus shake correction is performed.

At the time of automatic focusing in lens driving device 1, AF coil part 111 is energized. When AF coil part 111 is energized, a Lorentz force is generated at AF coil part 111 by interaction between the magnetic field of magnet part 125 and the current flowing through AF coil part 111.

The direction of the Lorentz force (the Z direction) is orthogonal to the direction of the current flowing through AF coil part 111 and the direction of the magnetic field. Since magnet part 125 is fixed, a reactive force acts on AF coil part 111.

With this reactive force serving as the driving force of the AF voice coil motor, AF movable part 11 including AF coil part 111 moves in the Z direction (light axis direction), and thus focusing is performed.

Overview of Present Embodiment

Lens driving device 1 according to the present embodiment corrects shake by moving OIS movable part 10 (also referred to as movable part) holding the lens barrel (not illustrated) in a direction (for example, the X direction, the Y direction) orthogonal to optical axis direction (the Z direction). Lens driving device 1 includes OIS fixing part 20 (fixing part also referred to as) and a plurality of suspension wires 30A to 30D. OIS fixing part 20 is separated from OIS movable part 10 in the optical axis direction. Suspension wires 30A to 30D extend along the direction of the optical axis and support OIS movable part 10 with respect to OIS fixing part 20 such that OIS movable part 10 is displaceable in the direction orthogonal to the direction of the optical axis. One end of each of suspension wires 30A to 30D is fixed to OIS fixing part 20, and the other end of each of suspension wires 30A to 30D is fixed to OIS movable part 10. OIS fixing part 20 includes base member 25 and lead 26 (also referred to as wire connecting member). Base member 25 is formed of a non-conductive material. Lead 26 is formed of conductive material. Lead 26 includes second lead main body 266 and first lead main body 261 embedded in base member 25 (also referred to as main body part), and first wire connecting part 260 and second wire connecting part 265 (also referred to as wire connecting part) which are exposed from base member 25 at positions remote from OIS movable part 10 relative to first lead main body 261 and second lead main body 266 in the optical axis direction. One ends of suspension wires 30A to 30D are fixed to first wire connecting part 260 and second wire connecting part 265.

Operation and Effect of Present Embodiment

With lens driving device 1 of the present embodiment having the above-mentioned configuration, the effective length of suspension wire 30 can be ensured. That is, in the present embodiment, one ends (lower ends) of suspension wires 30 are fixed to first wire connecting parts 260 of first lead elements 26a and 26b and second wire connecting parts 265 of second lead elements 26c and 26d exposed at the four corners of base member 25. In view of this, it is possible to achieve a larger effective length of suspension wire 30 in comparison with a structure in which one ends (lower ends) of suspension wires 30 are fixed to a member (for example, coil substrate 21 or the like) disposed at a position nearer to OIS movable part 10 (that is, on the + side in the Z direction) relative to base member 25 as disclosed in PTL 1.

In particular, in the present embodiment, first wire connecting parts 260 and second wire connecting parts 265 of lead 26 are disposed at positions remote from OIS movable part 10 (that is on the − side in the Z direction) relative to first lead main bodies 261 and second lead main bodies 266 embedded in base member 25. Accordingly, it is possible to achieve a larger effective length of suspension wire 30 in comparison with the structure in which first wire connecting part 260 and second wire connecting part 265 are disposed at the same position as first lead main body 261 and second lead main body 266 in the Z direction.

In addition, with lead 26 having the above-mentioned structure, first wire connecting part 260 and second wire connecting part 265 can be disposed at positions remote from OIS movable part 10 with first lead main body 261 and second lead main body 266 completely embedded in base member 25. Thus, it is possible to achieve a larger effective length of suspension wire 30 while achieving the improvement of the coupling power of lead 26 to base member 25.

As described above, with lens driving device 1 of the present embodiment, the reliability of lens driving device 1 is improved since the effective length of suspension wire 30 can be ensured, and the rupture of suspension wire 30 due to metal fatigue can be reduced.

The module A having the above-mentioned configuration is washed in the assembled state illustrated in FIG. 2 to remove powdery materials adhered thereto in the manufacturing processes. According to new findings of the present inventor, in such a washing process, damper 15 might move to the + side in the Z direction and adhere to front end surface 121b of stopper protrusion 121.

Lens driving device 1 of the present embodiment can prevent adhesion of damper 15 to front end surface 121b of stopper protrusion 121. Specifically, in lens driving device 1 of the present embodiment, stopper protrusion 121 includes flow stopper part 121a at the side surface thereof. Flow stopper part 121a is provided at the surface that serves as a path of damper 15 moving to the + side in the Z direction in the side surface of stopper protrusion 121, and thus flow stopper part 121a serves as a resistance against displacement of damper 15 along the direction of arrow a of FIG. 11 toward the + side in the Z direction on the side surface of stopper protrusion 121, for example. As a result, adhesion of damper 15 to front end surface 121b of stopper protrusion 121 is reduced or prevented.

Supplementary Note

While the invention made by the present inventor has been specifically described based on the preferred embodiment, it is not intended to limit the present invention to the above-mentioned preferred embodiment but the present invention may be further modified within the scope and spirit of the invention defined by the appended claims.

While smartphone M serving as a camera-equipped mobile terminal is described in the embodiment as an example of a camera mounting device having camera module A, the present invention is applicable to a camera mounting device serving as an information apparatus or a transport apparatus. The camera mounting device serving as an information apparatus is an information apparatus including a camera module and a control section that processes image information obtained with the camera module, such as a camera-equipped mobile phone, a note-type personal computer, a tablet terminal, a mobile game machine, a webcamera, and a camera-equipped in-vehicle apparatus (such as a rear-view monitor apparatus and a drive recorder apparatus). In addition, the camera mounting device serving as a transport apparatus is a transport apparatus, such as an automobile, including a camera module and a control section that processes an image obtained with the camera module.

Figure 23A:
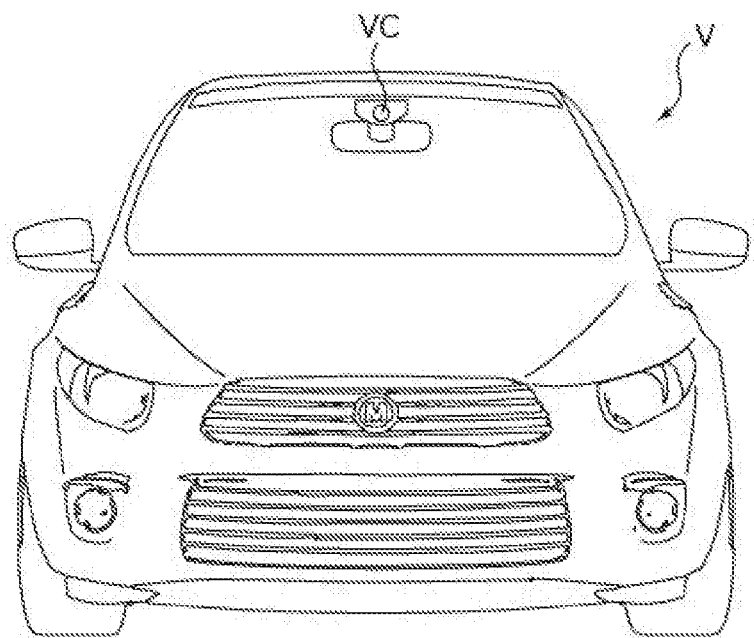
FIG. 23A and FIG. 23B illustrate an automobile including a camera mounting apparatus including an in-vehicle camera module.
Figure 23B:
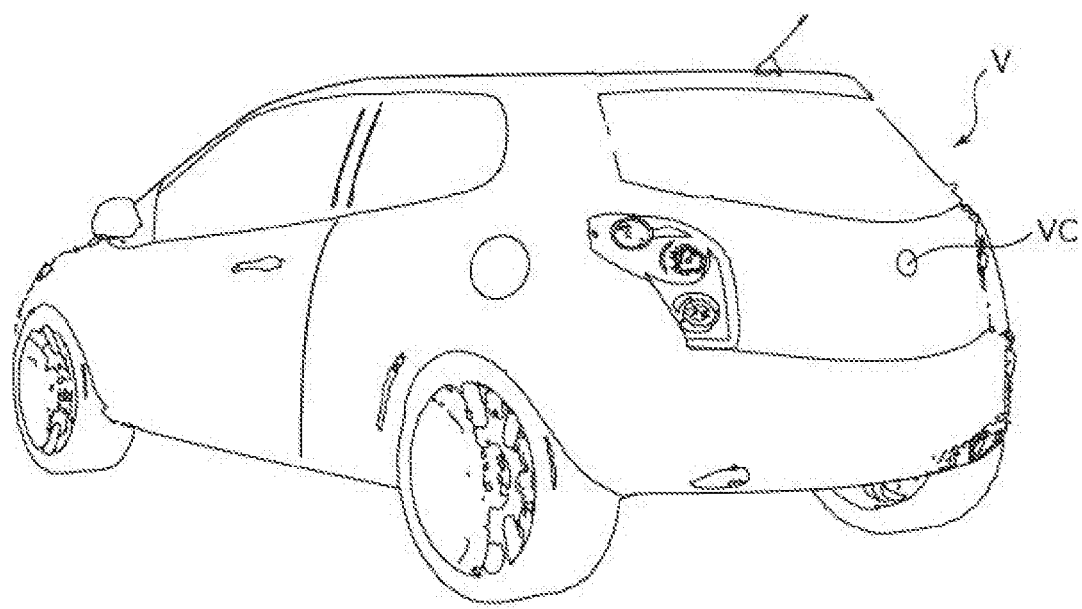

FIG. 23A and FIG. 23B illustrate automobile V serving as a camera mounting device in which an in-vehicle camera module vehicle camera (VC) is mounted. FIG. 23A is a front view of automobile V, and FIG. 23B is a rear perspective view of automobile V. In automobile V, camera module A described in the embodiment is mounted as in-vehicle camera module VC. As illustrated in FIG. 23A and FIG. 23B, in-vehicle camera module VC is attached to the windshield so as to face the front side, or attached to the rear gate so as to face the rear side, for example. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

INDUSTRIAL APPLICABILITY

The lens driving device, the camera module, and the camera mounting apparatus according to the embodiment of the present invention can be mounted in a slim-camera-mounting apparatus such as a smartphone, a mobile phone, a digital camera, a note-type personal computer, a tablet terminal, a mobile game machine, and an in-vehicle camera.

REFERENCE SIGNS LIST

A Camera module
M Smartphone
1 Lens driving device
10 OIS movable part
11 AF movable part
110 Lens holder
110a Lens housing part
110b Upper flange
110c Lower flange
110d Coil winding part
110e Upper protruding part
110f, 110h Upper spring fixing part
110g, 110i Upper boss
110j Lower protruding part
110k Lower spring fixing part
110m Lower boss
110n Tying part
111 AF coil part
12 AF fixing part
12a Magnet holder 120a Arc groove
120b Magnet cover part
120c Magnet installation part
120d Lower spring fixing part
120d1 Lower boss
120e1, 120e2 Upper spring fixing part
120f1, 120f2 Upper boss
120h1, 120h2, 120h3, 120h4 Wire insertion part
121, 121A, 121B, 121C, 121D Stopper protrusion
121a Flow stopper part
121b End surface
121c Inner surface
121d Center inner surface
121e Side inner surface
121f Outer surface
121g Outer recessed surface
121h, 121h1, 121h2, 121h3, 121h4 Wire-opposing surface
121i, 121i1, 121i2, 121i3, 121i4 Side outer surface
121k, 121k1 First opposing surface
121m, 121m1 Second opposing surface
121n, 121n1 Stopper step
121p, 121p1 First side surface
121q, 121q1 Second side surface
121r, 121r1 Side stopper step
121s1 Flow stopper protrusion
121s2 Side flow stopper protrusion
121t1 Flow stopper groove
121t2 Side flow stopper groove
121u1 Grain formation part
121u2 Side grain formation part
125 Magnet part
125A, 125B, 125C, 125D Permanent magnet
13 Upper elastic supporting part (upper leaf spring)
13a, 13b Upper spring element
130 Outer fixing part
130a, 130b Wire fixing part
130c, 130d First outer through hole
130e Second outer through hole
131 Inner fixing part
131a Inner through hole
132 Displacement allowance part
132a, 132b Displacement permission element
132c, 132d Meandering part
14 Lower elastic supporting part (lower leaf spring 14)
14a1, 14a2, 14a3, 14a4 Outer fixing part
140 Outer through hole
14b Inner fixing part
14c1, 14c2, 14c3, 14c4 Displacement allowance part
141 Meandering part
142 Inner through hole
15 Damper
20 OIS fixing part
21 Coil substrate
21a Chamfered part
21b Opening
21c First cutout
21d Second cutout
22 OIS coil part
22A, 22B, 22C, 22D OIS coil
23A, 23B Hall device
24 FPC
240 FPC main body
241 Chamfered part
242 Opening
243 First cutout
244 Second cutout
245 Terminal part
25 Base member
25a Base main body
250 Opening
250a Through hole
251 Terminal attaching portion
252 First protrusion
253 Second protrusion
254a, 254b Hall device recess
255 Lead cutout part
256 Lead installation space
257 Base leg part
258 Second base leg part
259 First reinforcement rib
26 Lead
26a, 26b first lead element
260 First wire connecting part
260a First through hole
261 First lead main body
261a First main body element
261b Positioning hole
261c First main body element
261d Positioning hole
262 Conduction piece
263a, 263b First step
26c, 26d Second lead element
265 Second wire connecting part
265a Second through hole
266 Second lead main body
266a Positioning hole
267 Second step
30 OIS supporting part (suspension wire)
30A, 30B, 30C, 30D Suspension wire
4 Cover
40 Opening
41 Top plate part

The invention claimed is:

1. A lens driving device that corrects shake by moving a movable part holding a lens barrel in a direction orthogonal to a direction of an optical axis, the lens driving device comprising:
a fixing part disposed in such a manner that the fixing part is separated from the movable part in the direction of the optical axis; and
a plurality of suspension wires that extend along the direction of the optical axis and support the movable part with respect to the fixing part in such a manner that the movable part is displaceable in the direction orthogonal to the direction of the optical axis, a first end of each suspension wire being fixed to the fixing part, a second end of each suspension wire being fixed to the movable part,
wherein the fixing part includes a base member formed of a non-conductive material and a wire connecting member formed of a conductive material, the wire connecting member including a main body part embedded in the base member and a wire connecting part exposed from the base member at a position remote from the movable part relative to the main body part in the direction of the optical axis, the first end of each suspension wire being fixed to the wire connecting part,
wherein the main body part and the wire connecting part are continuous with each other with a step part disposed between the main body part and the wire connecting part.

2. The lens driving device according to claim 1, wherein the step part is tilted in a direction toward the wire connecting part and away from the movable part.

3. The lens driving device according to claim 1,
wherein the base member includes cutout parts at four corners of the base member; and
wherein the wire connecting part protrudes to outside of the base member from each cutout part.

4. The lens driving device according to claim 1, wherein the base member includes a leg part disposed at a location near the wire connecting part and on a rear surface of the base member, the leg part protruding in a direction away from the movable part in the direction of the optical axis.

5. The lens driving device according to claim 1,
wherein the wire connecting member includes a conduction piece exposed at a front surface of the base member; and
wherein the conduction piece makes contact with a power source part disposed on a front side of the base member.

6. A camera module, comprising:
the lens driving device according to claim 1;
a lens part held by a movable part through a lens barrel; and
an image pickup part that picks up a subject image imaged by the lens part.

7. A camera mounting apparatus that is an information apparatus or a transporting apparatus, the camera mounting apparatus comprising:
the camera module according to claim 6; and
a control part that handles image information obtained by the camera module.

* * * * *